United States Patent
Henry

(10) Patent No.: US 11,093,539 B2
(45) Date of Patent: *Aug. 17, 2021

(54) PROVIDING KNOWLEDGE PANELS WITH SEARCH RESULTS

(71) Applicant: Google LLC, Mountain View, CA (US)

(72) Inventor: Jeromy William Henry, Aptos, CA (US)

(73) Assignee: GOOGLE LLC, Mountain View, CA (US)

( * ) Notice: Subject to any disclaimer, the term of this patent is extended or adjusted under 35 U.S.C. 154(b) by 77 days.

This patent is subject to a terminal disclaimer.

(21) Appl. No.: 16/413,241

(22) Filed: May 15, 2019

(65) Prior Publication Data

US 2019/0278793 A1    Sep. 12, 2019

Related U.S. Application Data

(63) Continuation of application No. 15/233,125, filed on Aug. 10, 2016, now Pat. No. 10,318,567, which is a
(Continued)

(51) Int. Cl.
*G06F 16/34* (2019.01)
*G06F 16/248* (2019.01)
(Continued)

(52) U.S. Cl.
CPC .......... *G06F 16/345* (2019.01); *G06F 16/248* (2019.01); *G06F 16/24578* (2019.01); *G06F 16/338* (2019.01); *G06F 16/951* (2019.01)

(58) Field of Classification Search
CPC .... G06F 16/346; G06F 16/338; G06F 16/248; G06F 16/9538
See application file for complete search history.

(56) References Cited

U.S. PATENT DOCUMENTS 5,944,769 A    8/1999    Musk et al.
5,964,831 A    10/1999   Kearns et al.
(Continued)

FOREIGN PATENT DOCUMENTS

CN    1461448      12/2003
JP    8-287155     11/1996
(Continued)

OTHER PUBLICATIONS

CN Office Action in Chinese Application No. 201810552197.8, dated Aug. 31, 2020, 7 pages (with English translation).
(Continued)

*Primary Examiner* — William Spieler
(74) *Attorney, Agent, or Firm* — Brake Hughes Bellermann LLP

(57) ABSTRACT

Methods, systems, and apparatus, including computer programs encoded on a computer storage medium, for providing knowledge panels with search results. In one aspect, a method includes obtaining search results that are responsive to a received query. A factual entity referenced by the query is identified. Content is identified for display in a knowledge panel for the factual entity. The content includes at least one content item obtained from a first resource and at least one second content item obtained from a second resource different than the first resource. Data is provided that causes the identified search results and the knowledge panel to be presented on a search results page. The knowledge panel presents the identified content in a knowledge panel area that is along side at least a portion of the search results.

20 Claims, 13 Drawing Sheets

Related U.S. Application Data continuation of application No. 15/001,533, filed on Jan. 20, 2016, now Pat. No. 9,454,611, which is a continuation of application No. 13/566,489, filed on Aug. 3, 2012, now Pat. No. 9,268,820.

(60) Provisional application No. 61/515,305, filed on Aug. 4, 2011.

(51) Int. Cl.
*G06F 16/338* (2019.01)
*G06F 16/951* (2019.01)
*G06F 16/2457* (2019.01)

(56) References Cited

U.S. PATENT DOCUMENTS

| | | | |
|---|---|---|---|
| 6,256,622 | B1 | 7/2001 | Howard et al. |
| 7,487,146 | B2 | 2/2009 | Friedman |
| 7,702,671 | B2 | 4/2010 | Jacobs et al. |
| 7,783,622 | B1 | 8/2010 | Vandermolen et al. |
| 7,895,513 | B1 | 2/2011 | Puri et al. |
| 7,996,000 | B1 | 8/2011 | Dubinko et al. |
| 8,005,842 | B1 | 8/2011 | Pasca et al. |
| 8,032,513 | B2 | 10/2011 | Newbold et al. |
| 8,095,582 | B2 | 1/2012 | Cramer |
| 8,346,815 | B2 | 1/2013 | Dasher et al. |
| 8,468,153 | B2 | 6/2013 | Truve et al. |
| 9,047,278 | B1* | 6/2015 | Mann ............... G06F 16/24578 |
| 9,262,548 | B2 | 2/2016 | Zechlin |
| 9,268,820 | B2 | 2/2016 | Henry |
| 9,454,611 | B2 | 9/2016 | Henry |
| 9,495,461 | B2 | 11/2016 | Batraski et al. |
| 10,353,554 | B2 | 7/2019 | Fey et al. |
| 2001/0038395 | A1 | 11/2001 | Holtzblatt et al. |
| 2003/0120654 | A1 | 6/2003 | Edlund et al. |
| 2003/0177445 | A1 | 9/2003 | Sunata |
| 2004/0117735 | A1 | 6/2004 | Breen |
| 2006/0026033 | A1* | 2/2006 | Brydon ............... G06Q 30/06 |
| | | | 705/7.11 |
| 2006/0085387 | A1 | 4/2006 | Aggarwal et al. |
| 2006/0179069 | A1 | 8/2006 | Bechtel et al. |
| 2006/0212433 | A1 | 9/2006 | Stachowiak et al. |
| 2007/0050339 | A1 | 3/2007 | Kasperski et al. |
| 2007/0192293 | A1 | 8/2007 | Swen |
| 2007/0233656 | A1 | 10/2007 | Bunescu et al. |
| 2007/0239675 | A1 | 10/2007 | Ragno et al. |
| 2007/0276803 | A1 | 11/2007 | Shakib et al. |
| 2008/0082512 | A1 | 4/2008 | Hogan et al. |
| 2008/0122796 | A1 | 5/2008 | Jobs et al. |
| 2008/0130960 | A1* | 6/2008 | Yagnik ............... G06F 16/583 |
| | | | 382/118 |
| 2008/0133483 | A1 | 6/2008 | Bayley et al. |
| 2008/0147590 | A1 | 6/2008 | Bechtel et al. |
| 2008/0147709 | A1 | 6/2008 | Read |
| 2008/0228720 | A1 | 9/2008 | Mukherjee et al. |
| 2008/0270931 | A1 | 10/2008 | Bamford |
| 2008/0313147 | A1* | 12/2008 | Svore ............... G06F 16/3331 |
| 2009/0019031 | A1 | 1/2009 | Krovitz et al. |
| 2009/0055360 | A1 | 2/2009 | Morris et al. |
| 2009/0070322 | A1 | 3/2009 | Salvetti et al. |
| 2009/0077037 | A1 | 3/2009 | Wu et al. |
| 2009/0094211 | A1 | 4/2009 | Marvit et al. |
| 2009/0094223 | A1 | 4/2009 | Berk et al. |
| 2009/0132581 | A1 | 5/2009 | Ahlberg |
| 2009/0192968 | A1 | 7/2009 | Tunstall-Pedoe |
| 2009/0228817 | A1 | 9/2009 | Adams et al. |
| 2009/0234830 | A1 | 9/2009 | Olston et al. |
| 2009/0271368 | A1 | 10/2009 | Channell et al. |
| 2009/0271778 | A1 | 10/2009 | Mandyam et al. |
| 2009/0288021 | A1 | 11/2009 | Ioffe et al. |
| 2009/0300146 | A1 | 12/2009 | Park et al. |
| 2009/0307183 | A1 | 12/2009 | Vigen |
| 2009/0327268 | A1 | 12/2009 | Denney et al. |
| 2010/0023690 | A1 | 1/2010 | Dewar et al. |
| 2010/0036827 | A1 | 2/2010 | Jain |
| 2010/0131495 | A1 | 5/2010 | Murdock et al. |
| 2010/0197219 | A1 | 8/2010 | Issa et al. |
| 2010/0198837 | A1 | 8/2010 | Wu et al. |
| 2010/0205541 | A1 | 8/2010 | Rapaport et al. |
| 2010/0211561 | A1 | 8/2010 | Peterson et al. |
| 2010/0281417 | A1 | 11/2010 | Yolleck et al. |
| 2010/0287175 | A1 | 11/2010 | Beaudreau et al. |
| 2010/0296707 | A1 | 11/2010 | Murakami |
| 2010/0306166 | A1 | 12/2010 | Pantel et al. |
| 2011/0055189 | A1 | 3/2011 | Effrat et al. |
| 2011/0087985 | A1 | 4/2011 | Buchanan et al. |
| 2011/0196864 | A1 | 8/2011 | Mason et al. |
| 2012/0005198 | A1 | 1/2012 | Pontier et al. |
| 2012/0005585 | A1 | 1/2012 | Yum |
| 2012/0030567 | A1 | 2/2012 | Victor |
| 2012/0059838 | A1 | 3/2012 | Berntson |
| 2012/0096344 | A1 | 4/2012 | Ho et al. |
| 2012/0120110 | A1 | 5/2012 | Chae et al. |
| 2012/0124519 | A1 | 5/2012 | Uphoff et al. |
| 2012/0158825 | A1 | 6/2012 | Ganser |
| 2012/0254402 | A1 | 10/2012 | Panidepu et al. |
| 2012/0260158 | A1 | 10/2012 | Steelberg |
| 2013/0031198 | A1 | 1/2013 | Jemiolo et al. |
| 2013/0067364 | A1 | 3/2013 | Berntson et al. |
| 2013/0167072 | A1 | 6/2013 | Ari et al. |
| 2013/0215155 | A1* | 8/2013 | Pasceri ............... G06F 3/0485 |
| | | | 345/684 |
| 2013/0311458 | A1* | 11/2013 | Goel ............... G06F 16/248 |
| | | | 707/723 |
| 2014/0089305 | A1 | 3/2014 | Bedrax-Weiss et al. |
| 2016/0350414 | A1 | 12/2016 | Henry |
| 2019/0278448 | A1 | 9/2019 | Fey et al. |

FOREIGN PATENT DOCUMENTS

| | | |
|---|---|---|
| JP | 2001-344272 | 12/2001 |
| JP | 2008-537810 | 9/2008 |
| JP | 2009-525548 | 7/2009 |
| JP | 2010-541074 | 12/2010 |

OTHER PUBLICATIONS

CN Office Action in Chinese Application No. 201810552197.8, dated Jul. 18, 2019, 17 pages. (with English translation).
Bunescu et al., "Using Encyclopedic Knowledge for Named Entity Disambiguation" Apr. 2006.
Extended European Search Report issued in European Application No. 12819983.3 dated Mar. 31, 2015, 6 pages.
Notification of Transmittal of the International Search Report and the Written Opinion of the International Searching Authority, or the Declaration for PCT/US12/49594 dated Oct. 19, 2012, 14 pages.
Office Action issued in Australian Application No. 2012289936, dated Sep. 28, 2016, 3 pages.
Office Action issued in Australian Application No. 2017204864, dated Aug. 11, 2017, 3 pages.
Office Action issued in Chinese Application No. 201280048823.0 dated Oct. 27, 2017, 3 pages.
Office Action issued in Chinese Application No. 201280048823.0 dated Aug. 10, 2016, 20 pages (with English translation).
Office Action issued in Chinese Application No. 201280048823.0, dated Jun. 1, 2017, 6 pages (with English translation).
Office Action issued in European Application No. 12819983.3, dated Mar. 20, 2017, 6 pages.
Office Action issued in Japanese Application No. 2016-087785, dated Mar. 6, 2017, 4 pages (English Translation).
Singh, "Introducing the Knowledge Graph" May 16, 2012.
Slawski, "Bing's Categorized Search Results" Jul. 2010.
Summons to Attend Oral Proceedings issued in European Application No. 12819983.3, dated Mar. 16, 2018, 7 pages.
Wikipedia Freebase, accessed Nov. 29, 2017 (Year: 2017).
Wikipedia, Help:Infobox, Jun. 13, 2012, accessed Oct. 27, 2014.
Wikipedia, Knowledge Graph, accessed Nov. 29, 2017 (Year: 2017).

(56) References Cited

OTHER PUBLICATIONS

Yin, "Building Taxonomy of Web Searches Intents for Name Entity Queries" Apr. 2010.
CN Office Action in Chinese Application No. 201810552197, dated Mar. 9, 2020, 17 pages (with English translation).

* cited by examiner

PROVIDING KNOWLEDGE PANELS WITH SEARCH RESULTS

CROSS-REFERENCE TO RELATED APPLICATIONS

This application is a continuation application of, and claims priority to, U.S. patent application Ser. No. 15/233,125, titled "Providing Knowledge Panels With Search Results," filed on Aug. 10, 2016, which is a continuation application of, and claims priority to, U.S. patent application Ser. No. 15/001,533, now U.S. Pat. No. 9,454,611, titled "Providing Knowledge Panels With Search Results," filed on Jan. 20, 2016, which is a continuation application of, and claims priority to, U.S. patent application Ser. No. 13/566,489, now U.S. Pat. No. 9,268,820, titled "Providing Knowledge Panels With Search Results," filed on Aug. 3, 2012, which application claims the benefit under 35 U.S.C. § 119(e) of U.S. Patent Application No. 61/515,305, entitled "Apparatus And Method For Supplying Search Results With A Knowledge Card," filed Aug. 4, 2011. The disclosure of each of the foregoing applications is incorporated herein by reference.

BACKGROUND

This specification relates to presenting data with search results.

The Internet provides access to a wide variety of resources, such as image files, audio files, video files, and web pages. A search system can identify resources in response to queries submitted by users and provide information about the resources in a manner that is useful to the users. The users then navigate through (e.g., click on) the search results to acquire information of interest to the users.

Users of search systems are often searching for information regarding a specific entity. For example, users may want to learn about a singer that they just heard on the radio. Conventionally, the user would initiate a search for the singer and select from a list of search results determined to be relevant to the singer.

SUMMARY

In general, one innovative aspect of the subject matter described in this specification can be embodied in methods that include the actions of obtaining search results that are responsive to a received query; identifying a factual entity referenced by the query; identifying content for display in a knowledge panel for the factual entity, the content including at least one content item obtained from a first resource and at least one second content item obtained from a second resource different than the first resource; and providing data that causes the identified search results and the knowledge panel to be presented on a search results page, the knowledge panel presenting the identified content in a knowledge panel area along side at least a portion of the search results.

Other embodiments of this aspect include corresponding systems, apparatus, and computer programs, configured to perform the actions of the methods, encoded on computer storage devices.

These and other embodiments can each optionally include one or more of the following features. The content can include at least two of an image for the factual entity, a title for the factual entity, or a fact regarding the factual entity. The knowledge panel area can consume a larger area than each of the search results.

Identifying content for display in the knowledge panel for the factual entity can include selecting the content for the knowledge panel based on a ranking of content for the factual entity, the ranking being based on user search events related to the factual entity.

The knowledge panel can include an interactive user interface object. Aspects can further include receiving information specifying an interaction with the interactive user interface object and providing data that causes additional content to be presented within the knowledge panel. The additional content can be selected based on the interaction.

Aspects can further include determining that the received query is associated with multiple distinct meanings and identifying content related to each of the distinct meanings. The knowledge panel can include content for two or more of the distinct meanings.

Aspects can further include identifying a type of entity for the factual entity; identifying a knowledge panel template based on the type of entity; and generating the knowledge panel by populating the knowledge panel template with the identified content items.

Identifying content for display in the knowledge panel for the factual entity can include identifying types of content items specified by the knowledge panel template.

The factual entity can include a person. The knowledge panel can include a placeholder for each of an image of the person, a description of the person, and at least one fact about the person.

The factual entity can include a place. The knowledge panel can include a placeholder for each of an image depicting a map associated with the place, a description of the place, and at least one fact about the place.

Particular embodiments of the subject matter described in this specification can be implemented so as to realize one or more of the following advantages. A knowledge panel is presented with search results (or other pages) to provide data regarding particular entities that have been identified as relevant to a search query. Presenting the knowledge panel with the search results reduces the number of web pages users have to visit in order to obtain factual information for which the users are searching, thereby reducing the time required for the users to find information that satisfies their informational needs. Knowledge panel templates developed for particular types of entities enable content relevant to the entities to be displayed to users.

Knowledge panels can improve users' search experiences, in particular for queries directed to learning, browsing, or discovery. For example, the knowledge panel supplies users with basic factual information or a summary of information about a particular entity referenced in a search query. Knowledge panels can assist users in navigating to related content in a seamless and natural way. Knowledge panels can supply new content that may not otherwise be encountered by a user without selecting several search results. Knowledge panels can also help users obtain information faster than they would if the users were required to click through multiple search results to obtain the information.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A system can provide one or more knowledge panels in response to a received search query. A knowledge panel is a user interface element that provides information or other content related to a particular entity referenced by a search query, such as a person, place, country, landmark, animal, historical event, organization, business, sports team, sporting event, movie, song, album, game, work of art, or any other entity.

In some implementations, a knowledge panel provides a summary of information for the entity. For example, a knowledge panel for a singer may include the name of the singer, an image of the singer, a description of the singer, one or more facts about the singer, and content that identifies songs and albums recorded by the singer. Other types of information and content can also be presented in the knowledge panel.

The content of a knowledge panel may include content published or otherwise provided by multiple resources, such as multiple web pages. For example, a knowledge panel for a landmark may include an image of the landmark that has been published on a first web page that is hosted by a first publisher. The knowledge panel may also include a set of facts about the landmark that have been published on a second web page published by a second publisher different from the first publisher.

A knowledge panel may be presented inline or adjacent to other search results for a received query or in place of the other search results. For example, standard search results that provide a link to resources deemed to be responsive to the search query may be presented on one side of a search results page and a knowledge panel may be presented on the other side of the search results page.

Figure 1:
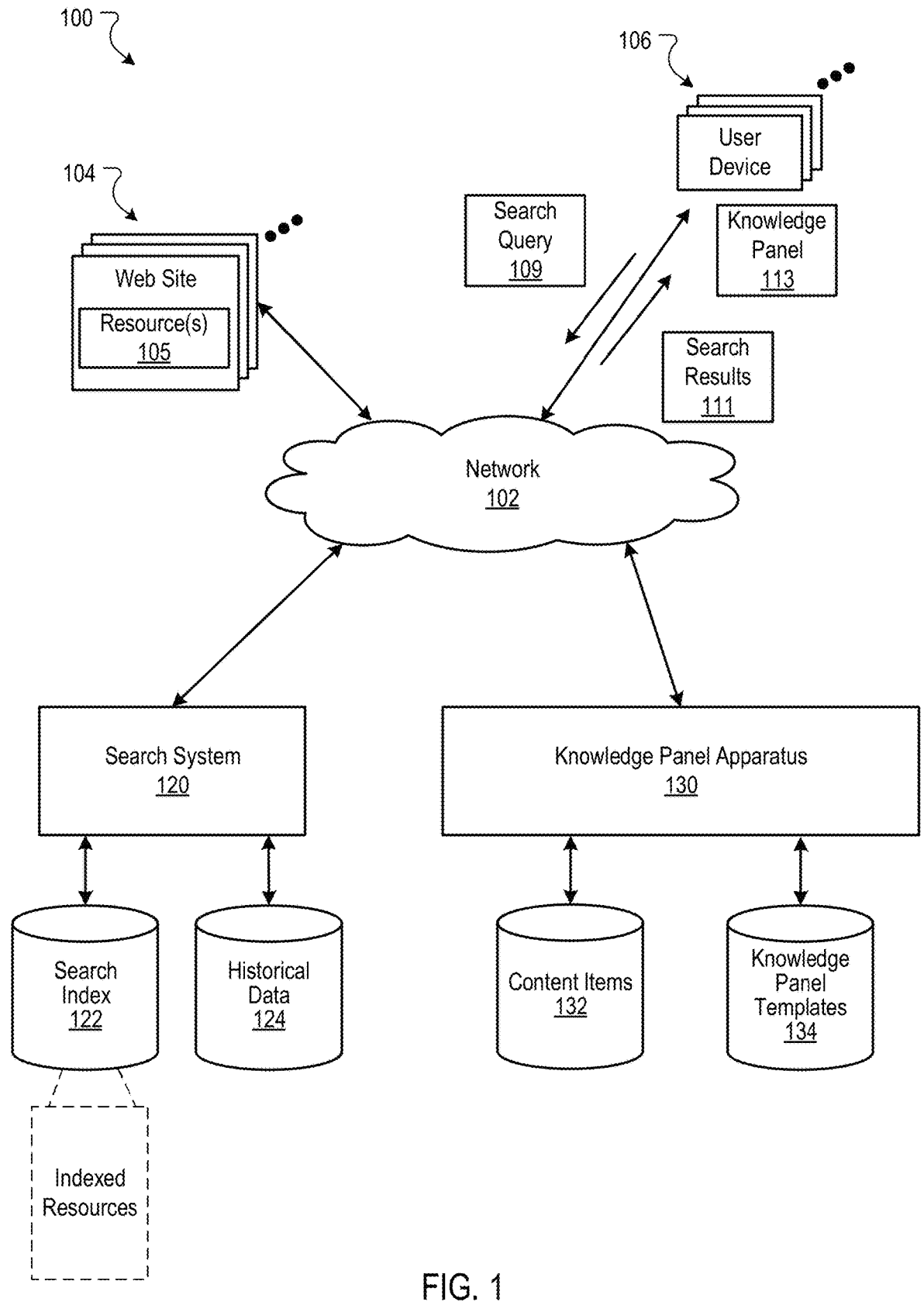
FIG. 1 is a block diagram of an example environment in which a search system provides search services.

FIG. 1 is a block diagram of an example environment 100 in which a search system 120 provides search services. The example environment 100 includes a network 102, e.g., a local area network (LAN), wide area network (WAN), the Internet, or a combination of them, connects web sites 104, user devices 106, and the search system 120. The network 102 can be accessed over a wired and/or a wireless communications link. For example, mobile computing devices, such as smartphones can utilize a cellular network to access the network. The environment 100 may include millions of web sites 104 and user devices 106.

A web site 104 is one or more resources 105 associated with a domain name and hosted by one or more servers. An example web site is a collection of web pages formatted in hypertext markup language (HTML) that can contain text, images, multimedia content, and programming elements, e.g., scripts. Each web site 104 is maintained by a publisher, e.g., an entity that manages and/or owns the web site.

A resource 105 is data provided over the network 102 and that is associated with a resource address, e.g., a uniform resource locator. Resources 105 that can be provided by a web site 104 include HTML pages, word processing documents, and portable document format (PDF) documents, images, video, and feed sources, to name just a few. The resources 105 can include content, e.g., words, phrases, images and sounds and may include embedded information, e.g., meta information and hyperlinks, and/or embedded instructions, e.g., scripts.

A user device 106 is an electronic device that is under control of a user and is capable of requesting and receiving resources 105 over the network 102. Example user devices 106 include personal computers, mobile computing devices, e.g., smartphones and/or tablet computing devices, that can send and receive data over the network 102. As used throughout this document the term mobile computing device ("mobile device") refers to a user device that is configured to communicate over a mobile communications network. A smartphone, (i.e., a phone that is enabled to communicate over the Internet) is an example of a mobile device. A user device 106 typically includes a user application, e.g., a web browser, to facilitate the sending and receiving of data over the network 102.

To facilitate searching of resources 105, the search system 120 identifies the resources 105 by crawling and indexing the resources 105 provided on web sites 104. Data about the resources 105 can be indexed based on the resource to which the data corresponds. The indexed and, optionally, cached copies of the resources 105 are stored in a search index 122.

The user devices 106 submit search queries 109 to the search system 120. In response, the search system 120 accesses the search index 122 to identify resources 105 that are relevant to, e.g., have at least a minimum specified relevance score for, the search query 109. The search system 120 identifies the resources 105, generates search results 111 that identify the resources 105, and returns the search results 111 to the user devices 106. A search result 111 is data generated by the search system 120 that identifies a resource 105 that is responsive to a particular search query, and includes a link to the resource 105. An example search result 111 can include a web page title, a snippet of text or a portion of an image extracted from the web page, and the URL of the web page.

Data for the search queries 109 submitted during user sessions are stored in a data store, such as the historical data store 124. For example, the search system 110 can store received search queries in the historical data store 124.

Selection data specifying actions taken in response to search results 111 provided in response to each search query 109 are also stored in the historical data store 124, for example, by the search system 120. These actions can include whether a search result 111 was selected (e.g., clicked or hovered over with a pointer). The selection data can also include, for each selection of a search result 111, data identifying the search query 109 for which the search result 111 was provided.

The example environment 100 also includes a knowledge panel apparatus 130 communicably coupled to the search system 120 (e.g., directly coupled or coupled over a network such as network 102). The search system 120 can interact with the knowledge panel apparatus 130 to determine whether to provide a knowledge panel 113 with search results 111 for a search query 109. If it is determined that a knowledge panel 113 should be provided, the knowledge panel apparatus 130 can generate the knowledge panel 113 and provide the generated knowledge panel 113 to the search system 120, which in turn provides search results 111 and a knowledge panel 113 to the user device 106 that submitted the search query 109.

A knowledge panel 113 is typically provided for queries that have been determined to reference a particular entity, such as a person, place, country, landmark, animal, historical event, organization, business, sports team, sporting event, movie, song, album, game, work of art, or any other entity. In general, a knowledge panel 113 for a particular entity includes content related to the particular entity. In some implementations, a knowledge panel 113 includes a set of factual information deemed relevant to the particular entity. For example, a knowledge panel 113 for an actor may include biographical information for the actor, as well as content associated with movies or television shows that the actor has appeared. In some implementations, the knowledge panel 113 includes a summary of information related to the particular entity. For example, a knowledge panel 113 for a nation may include a map of the nation, the flag of the nation, the official language of the nation, and/or other facts and content related to the nation.

In some implementations, a knowledge panel 113 is much larger and consumes more area of a search interface than standard search results 111. For example, the knowledge panel 113 may span the length of three or more standard search results 111 to accommodate the content items in the knowledge panel 113 and to draw attention to the knowledge panel 113.

In some implementations, a knowledge panel 113 is displayed in a knowledge panel area. The knowledge panel area may be presented with or alongside to a search results area that presents search results 111. In some implementations, the knowledge panel area consumes a larger area than the area consumed by two or more of the search results presented in the search results area.

The knowledge panel apparatus 130 includes or is communicably coupled to one or more data storage units that include a content items store 132 and a knowledge panel templates store 134. The content items store 132 stores content items that can be inserted into a knowledge panel. In general, the content items are discrete units of content and can be in the form of text, images, videos, graphics, audio, tables, or other types of content.

In some implementations, the content items store 132 includes an index of entities and data identifying content items relevant to the entities. For example, the index may include data identifying a title for an entity, one or more images relevant to the entity, a description of the entity, one or more facts about the entity, one or more videos relevant to the entity, upcoming events related to the entity, content from a social networking page associated with the entity, and other information or types or categories of content that have been deemed relevant to the entity.

The content items for each entity can come from disparate sources and/or disparate publishers. For example, content items for a particular entity can be obtained from several different web pages or other resources that are each hosted by different publishers. To illustrate, the content items for a particular actor may include images of the actor received from several different sources and these images can be included in the same knowledge panel that is provided in response to a query that references the particular actor. As another example, an image of a person may be obtained from an official site for the person, and a set of facts and/or description for the person may be obtained from an online encyclopedia.

In some implementations, the knowledge panel apparatus 130 identifies content items for each of a set of entities by crawling the Internet for content related to the entity. The knowledge panel apparatus 130 can also determine which of the obtained content items to provide with a knowledge panel 113 for the entity. For example, some of the content items may be more relevant to the entity or more appropriate for the knowledge panel 113 than other content items. As an example, an image of a person's face may be more appropriate for a knowledge panel 113 than an image of the person taken from a long distance.

The type or categories of content provided in a knowledge panel 113 may be determined based on the particular entity or the type of entity referenced by the knowledge panel 113. For example, a knowledge panel 113 for a person may include an image of the person, facts about the person, and references to any public works produced by the person. By way of another example, a knowledge panel 113 for a landmark may include images of the landmark, facts about the landmark, and travel information, such as a map, for a person to travel to the landmark. The categories of content that are included in a knowledge panel 113 can also vary based on the particular entity. For example, a person that has acted in movies and that has also recorded one or more albums may include references to both types of works. A knowledge panel template may specify the content for a knowledge panel 113, as described in more detail below.

Although different types of content can be provided for different types of entities and/or different entities within an entity type, the knowledge panels 113 can be configured to provide a recognizable and consistent user interface for users. In some implementations, each knowledge panel 113 can have one or more standard types of content items. For example, the standard types of content items can include a title, an image, a description, and one or more facts about the entity for which the knowledge panel 113 is provided.

In some implementations, the title for a knowledge panel 113 is the name of the entity or an alias of the entity. For example, the title for a knowledge panel 113 provided for a person can be the name of the person. Similarly, the title for a knowledge panel 113 provided for a country can be the name of the country. As the name of the entity may be different from the search query 109 for which the knowledge panel 113 is provided, the title may also be different than the search query 109. For example, a search query 109 may reference an alias or a shortened version of a celebrity's name, while the title for the knowledge panel 113 may include the celebrity's full legal name. In this way, the title provides confirmation of what the knowledge panel 113 references.

The description for the knowledge panel 113 can provide an adequate explanation of what the entity is, such as a summary of the entity, without going into so much detail to distract from the search interface (or other page) in which the knowledge panel 113 is presented. Candidate descriptions can be obtained from a variety of places, such as prefixes of text from trusted encyclopedia articles or top ranking web pages.

The image for a knowledge panel 113 can be an image representative of the entity for which the knowledge panel 113 is generated. This image may vary based on the type of entity and the entity itself. For example, an image for a country may include a map of the country, while an image for a person may include a representative image of the person.

The image for a knowledge panel 113 may be selected by taking a top ranking image from search results for the entity of the knowledge panel 113. For example, a web search directed to images can be performed for an entity and the top ranking image may be selected for the search results for inclusion in knowledge panels 113 for the entity.

The set of facts that are presented in a knowledge panel 113 may be determined based on the type of entity and/or the entity itself. For example, certain facts may be preferred for actors, and a different set of facts may be preferred for singers. Also, certain facts may be relevant to certain entities within an entity type, while not being relevant to other entities within the entity type. For example, a knowledge panel 113 for an actor that has won many awards may include a listing of the awards in the set of facts. However, a listing of awards may be omitted for an actor that has not yet won any awards.

The set of facts that are presented for a particular entity may be based on previously received search queries 109 that referenced the particular entity. For example, if a significant number, e.g., at least a threshold number, of previously received search queries 109 have referenced a person's height, then the person's height may be included in the set of facts that are presented in a knowledge panel for that person. In general, the facts for an entity can be ranked based on the number of the previously received search queries that have been deemed to be requesting information about the entity and that have been deemed to be requesting information about that fact.

Each of the standard types of content items, e.g., title, image, description, and set of facts, can consistently be located in a same portion of the knowledge panel 113 to provide a consistent user interface across knowledge panels 113 for different types of entities. For example, an image may be located near the top left corner of the knowledge panel 113 and the description and facts may be located to the right of the image. If a content item for one of the types of content items is not available for an entity, then that type of content item may be replaced with another type of content item. For example, if an entity does not have an available image, one or more facts may be presented in the knowledge panel in place of an image. Note that the standard types of content items referenced throughout this document are provided above for purpose of example, and that other types of content items can be selected as standard content items.

The knowledge panel templates store 134 stores knowledge panel templates that can be populated with content items to generate a knowledge panel 113. In general, a knowledge panel template specifies types of content items to include in the knowledge panel 113 and includes placeholders for content items of the specified type. For example, a knowledge panel template may include placeholders for a title, one or more images, a description, a set of facts, and/or other types of content items.

The knowledge panel templates store 134 can include one or more templates for each of a set of entity types. For example, the knowledge panel templates store 134 may include one or more "person" templates, "place" templates, "landmark" templates, "movie" templates, "business" templates, "game" templates, "sports team" templates, "sports event" templates, and/or "disambiguation" templates. A knowledge panel template for a particular type of entity may have placeholders for different content item types than a knowledge panel template for another type of entity. For example, a knowledge panel template for a country may include a placeholder for a set of images of cities in the country, while a knowledge panel template for a landmark may include a placeholder for a set of images of other landmarks. Other types of content particular to a type of entity are described below.

The knowledge panel templates store 134 may also include knowledge panel templates for entity subtypes. For example, under the "person" entity type, there may be an "actor" knowledge panel template, a "singer" knowledge panel template, and/or a "historical figure" knowledge panel template. A knowledge panel template for actors may include a placeholder for a set of images of movie or television show posters for movies or television shows in which the actor performed, while a knowledge panel template for singers may include a placeholder for a table element having information regarding songs released by the singer.

Figure 2:
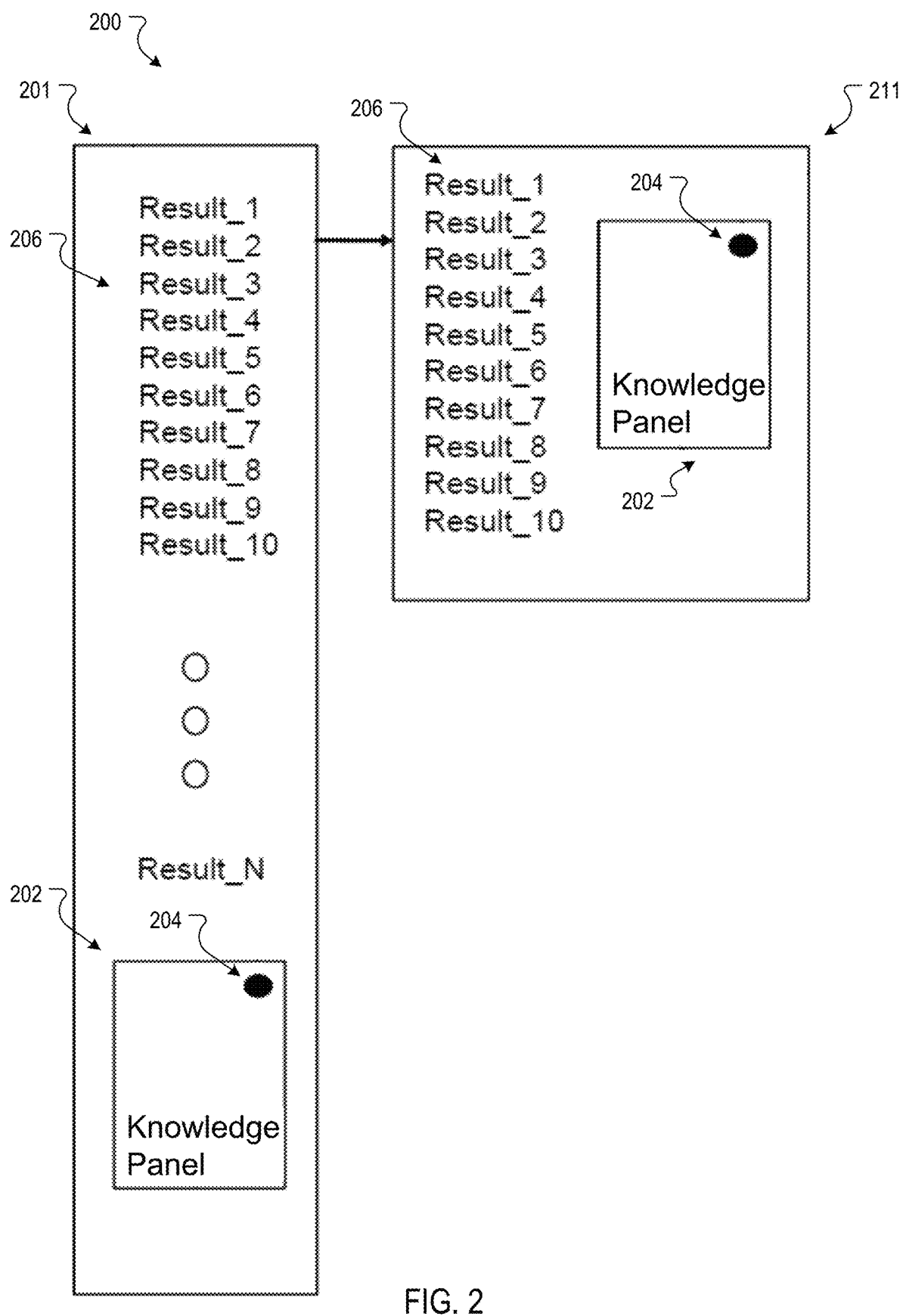
FIG. 2 is a block diagram illustrating a process for supplying search results and a knowledge panel.

FIG. 2 is a block diagram illustrating a process 200 for supplying search results 206 and a knowledge panel 202. In response to receiving a search query, for example a search query that references a particular entity, the search system 120 can identify a set of search results 206 and interact with the knowledge panel apparatus 130 to generate the knowledge panel 202. The search system 120 can also associate the knowledge panel 202 with the set of search results 206. In this example, the set of search results 206 includes Result_1 through Result N. The content identified and generated by the search system 120 in conjunction with the knowledge panel apparatus 130 is shown in block 201.

The example knowledge panel 202 includes a control 204. The control 204 can include a minimization control, an expansion control, and/or a hide control. A minimization control causes the knowledge panel 202 to be minimized when activated. Similarly, an expansion control causes the knowledge panel 202 to expand when activated. The hide control causes the knowledge panel 202 to be hidden when activated. A user may select the control 204 to arrange the knowledge panel 202, for example to facilitate a user optimized search session.

The search system 120 can provide the set of search results 206 or a subset thereof to a user device for presentation in a search interface 211. The search system 120 can also provide the knowledge panel 202 to the user device for presentation in the search interface 211. In this example, the knowledge panel 202 is displayed on the right side of the search results 206. In some implementations, the knowledge panel 202 may be displayed to the left of the search results 206, above the search results 206, below the search results 206, or between two of the search results 206.

Figure 3:
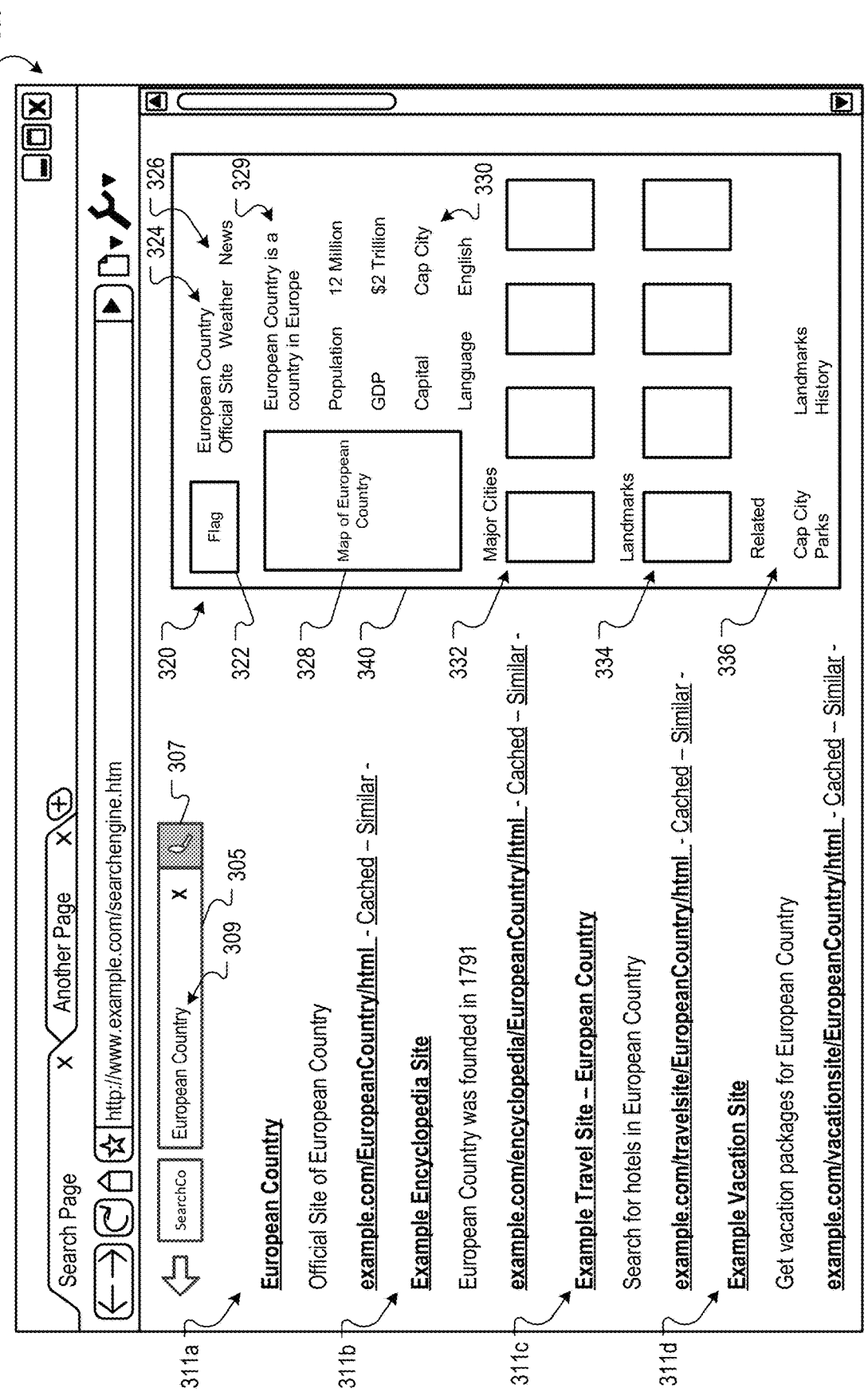
FIG. 3 is a screen shot of an example search interface in which a knowledge panel is presented with search results.

FIG. 3 is a screen shot of an example search interface 300 in which a knowledge panel 320 is presented with search results 311*a*-311*d*. The search interface 300 can be presented at a user device 106 and includes a query entry field 305 in which a user can enter a search query 309. The search interface 300 also includes a query initiation element 307 with which the search query 309 can be submitted to the search system 120. For example, in response to user interaction with the search initiation element 307, the user device 106 can submit the search query 309 to the search system 120.

The search interface 300 also includes a knowledge panel 320 and search results 311*a*-311*d*. In this example search interface 300, the knowledge panel 320 and the search results 311*a*-311*d* have been provided in response to the search query "European Country." Although one knowledge panel 320 and four search results 311*a*-311*d* are illustrated in the search interface 300, other numbers of knowledge panels and other numbers of search results can be presented in a search interface.

The knowledge panel 320 is for a country ("European Country"), and can be generated using a "place" template for example. The "place" template can specify types of content items with which the knowledge panel 320 is to be populated and include placeholders for the types of content items. For example, the "place" template may include a placeholder for each of a title, an image depicting a map of the place, a description, a set of facts, one or more sets of images, and/or related search queries.

The knowledge panel 320 includes a title 324 and links 326 to resources having additional information about the European Country. For example, the links 326 include a link to an official web site, weather information, and news about the European Country.

The knowledge panel 320 also includes an image depicting the flag for the European Country 322, an image depicting a map of the European Country 328, a description of the European Country 329, and a set of facts about the European Country 330. In this example, the set of facts 330 includes population, GDP, capital and language. The set of facts 330 for the knowledge panel 320 may be selected based on the popularity of the facts with respect to historical search data for the entity, in this example the European Country. For example, facts about the European Country searched for more often, e.g., the top X number of searched for facts, may be selected for inclusion in the set of facts over facts that have not been search for as often.

The knowledge panel 320 also includes two sets of images 332 and 334. The set of images 332 includes images of cities in the country and the set of images 334 includes images of landmarks located in the country. Each of these types of images can be considered a different type of content item for purposes of populating a knowledge panel. Each image may include a link that, when selected, causes a new search to be initiated for the subject of the image. For example, if an image of a city is selected, the search interface 320 may cause the user device 106 displaying the search interface 320 to submit a search query to the search system 120 for the city depicted in the image.

The knowledge panel 320 also includes a set of related search queries 336. The related search queries 336 may be queries related to the European Country. For example, the related search queries 336 may include queries that reference the European Country, cities within the European Country, or famous residents of the European Country. Each related search query may include a link that, when selected, initiates a search for the selected search query.

The content items included in the knowledge panel 320 can be obtained from multiple disparate sources. For example, the image of the flag 322 and the description 329 may be obtained from an online encyclopedia, while the images 332 of the cities may be obtained from a travel site independent of (e.g., provided by a different publisher than) the online encyclopedia.

As described above, a knowledge panel may be displayed in a knowledge panel area. In this example search interface 300, the area inside perimeter 340 may be considered the knowledge panel area. As shown in FIG. 3, this knowledge panel area and the knowledge panel 320 consume a larger area than each individual search results 311*a*-311*d*. In some implementation, the knowledge panel area or the knowledge panel may be substantially the same size as a standard search result or smaller than a standard search result.

Figure 4:
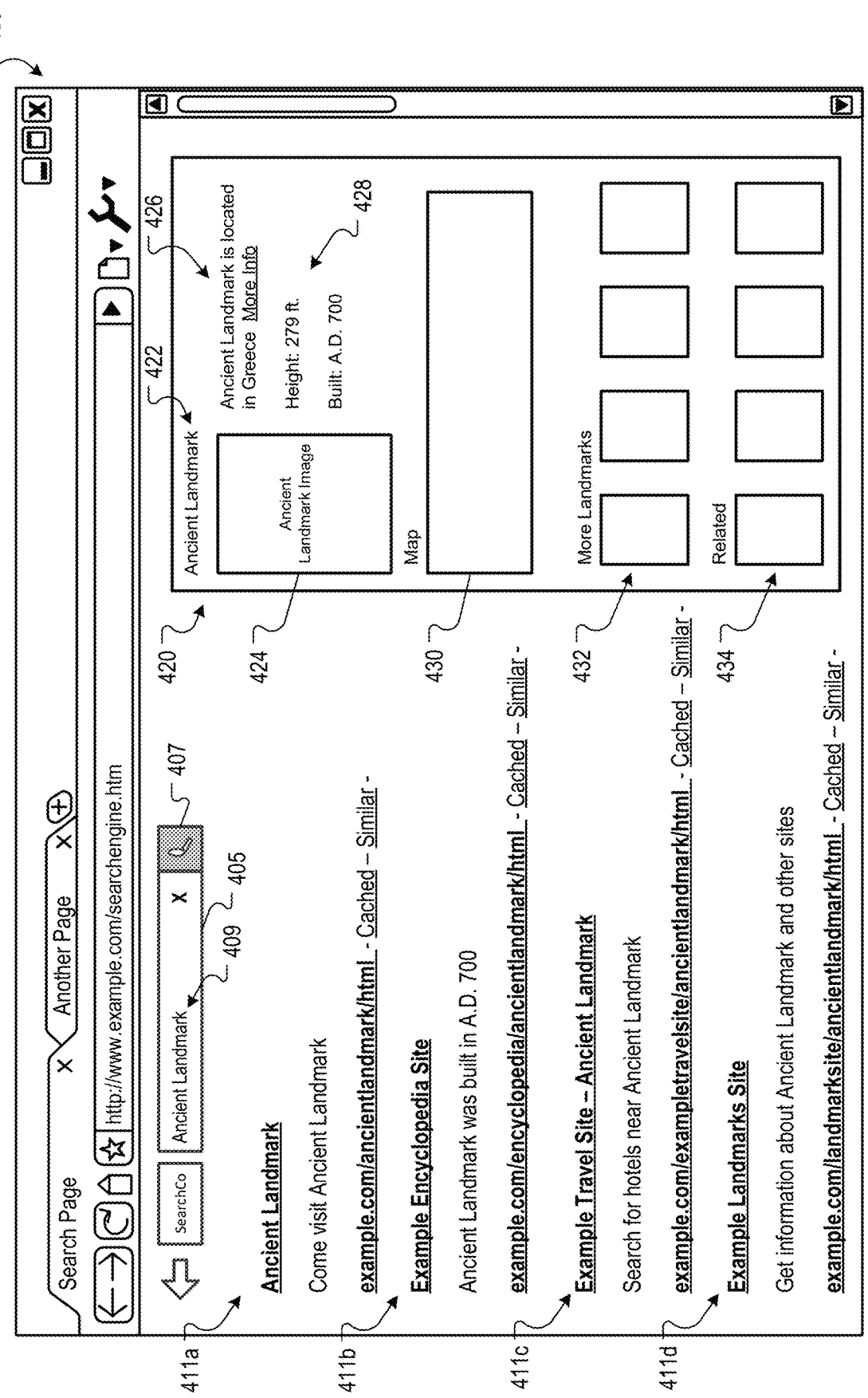
FIG. 4 is a screen shot of another example search interface in which a knowledge panel is presented with search results.

FIG. 4 is a screen shot of another example search interface 400 in which a knowledge panel 420 is presented with search results 411*a*-411*d*. Similar to the search interface 300, the search interface 400 includes a query entry field 405 in which a user can enter a search query 409 and a search initiation element 407 with which a search query 409 can be submitted to the search system 120. The search interface 400 also includes search results 411*a*-411*d* and a knowledge panel 420. In this example search interface 400, the knowledge panel 420 and the search results 411*a*-411*d* have been received from the search system 120 and/or the knowledge panel apparatus 130 in response to the submission of the search query "Ancient Landmark."

The knowledge panel 420 is for a landmark ("Ancient Landmark"), and can be generated using a "landmark" template. The "landmark" template can include placeholders for types of content related to landmarks, such as a title, an image of the landmark, a description, a set of facts, an image of a map for the landmark, one or more sets of other images that have been identified as relevant to the landmark, and related search queries.

The knowledge panel 420 includes a title 422, an image of the Ancient Landmark 424, a description of the Ancient Landmark 426, and a set of facts about the Ancient Landmark 428. This example set of facts 428 includes the height of the Ancient Landmark and the year the Ancient Landmark was built. The knowledge panel 420 also includes an image of a map for the Ancient Landmark 430, a set of images 432 that includes images of other landmarks, and a set of images 434 that includes images for related search queries. Each of the images 432 and 434 can include a link that, when selected, initiates a search for the subject of the image.

In some implementations, a knowledge panel for a place or for a landmark may include a reservation element that enables the user to secure reservations to visit the place or to visit the landmark. For example, the knowledge panel may include an interactive user interface element that receives user information, such as travel dates, origination location, and credit card information, and enables the user to secure the reservation within the knowledge panel. In some implementations, a knowledge panel for a place or landmark may include an interactive map that enables a user to obtain directions to the place or landmark.

Figure 5A:
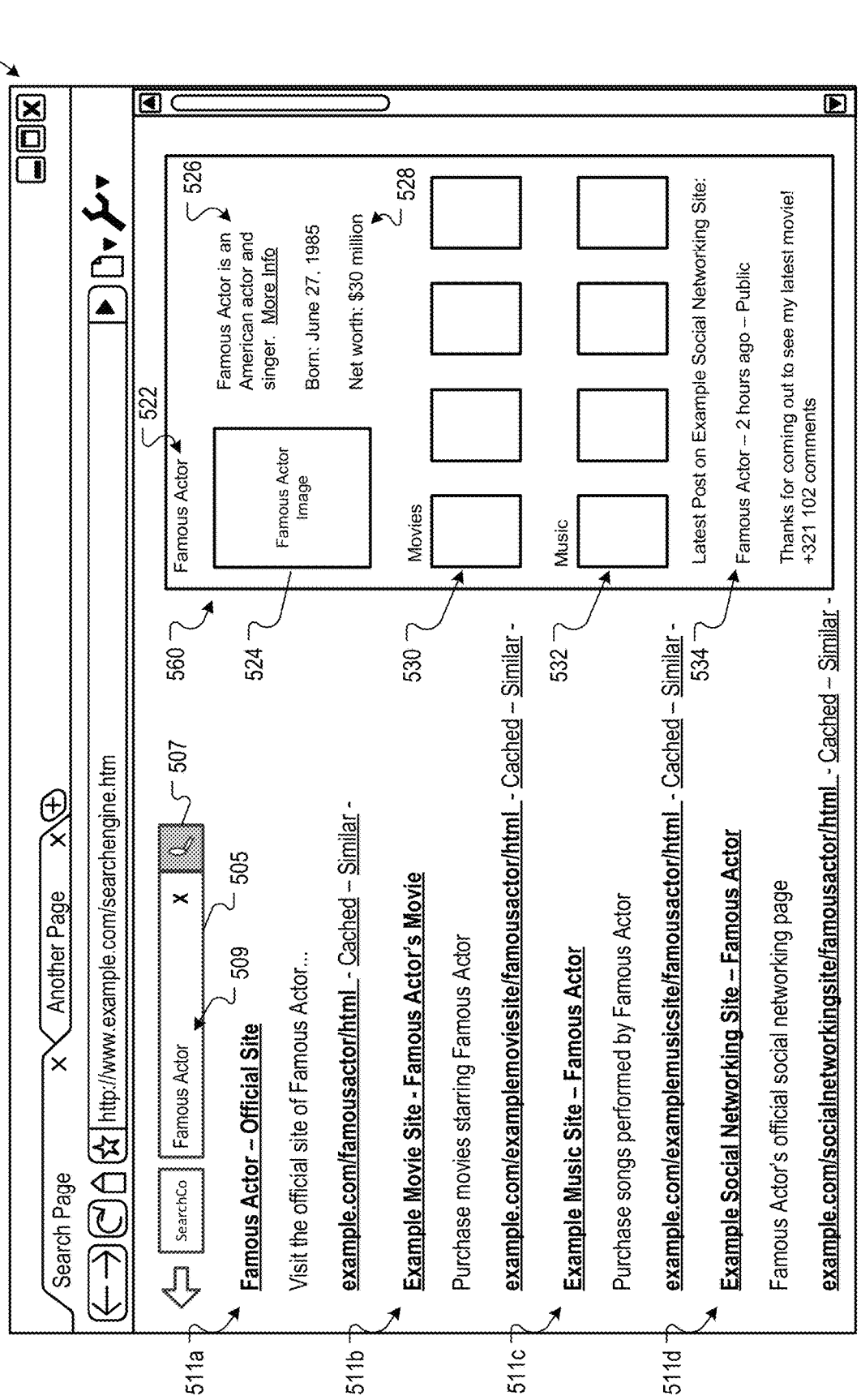
FIG. 5A is a screen shot of another example search interface in which a knowledge panel is presented with search results.

FIG. 5A is a screen shot of another example search interface 500 in which a knowledge panel 520 is presented with search results 511*a*-511*d*. Similar to the search interface 300, the search interface 500 includes a query entry field 505 in which a user can enter a search query 509 and a search initiation element 507 with which a search query 509 can be submitted to the search system 120. The search interface 500 also includes search results 511*a*-511*d* and a knowledge panel 520. In this example search interface 500, the knowledge panel 520 and the search results 511*a*-511*d* have been received from the search system 120 and/or the knowledge panel apparatus 130 in response to the submission of the search query "Famous Actor."

The knowledge panel 520 is for a person ("Famous Actor"), and can be generated using a "person" template. The "person" template can include placeholders for types of content related to a person, such as a title, an image of the person, a description, a set of facts, one or more sets of images, a table having information regarding the person, and related search queries.

In some implementations, there may be templates for particular types of people and the content of the templates may differ based on the type of person. For example, a template for a singer may include a table that includes a placeholder for a list of songs released by the singer, while a template for an actor may include a placeholder for images depicting posters of movies in which the actor appeared.

The example knowledge panel 520 includes a title 522, an image of Famous Actor 524, a description of Famous Actor 526, and a set of facts about Famous Actor 528. This example set of facts 528 includes the date of birth of Famous Actor and the net worth of Famous Actor. Other facts could also be presented in a "person" template and can vary based on the person. For example, if the person is deceased, the date of death may be included in the set of facts.

Figure 9:
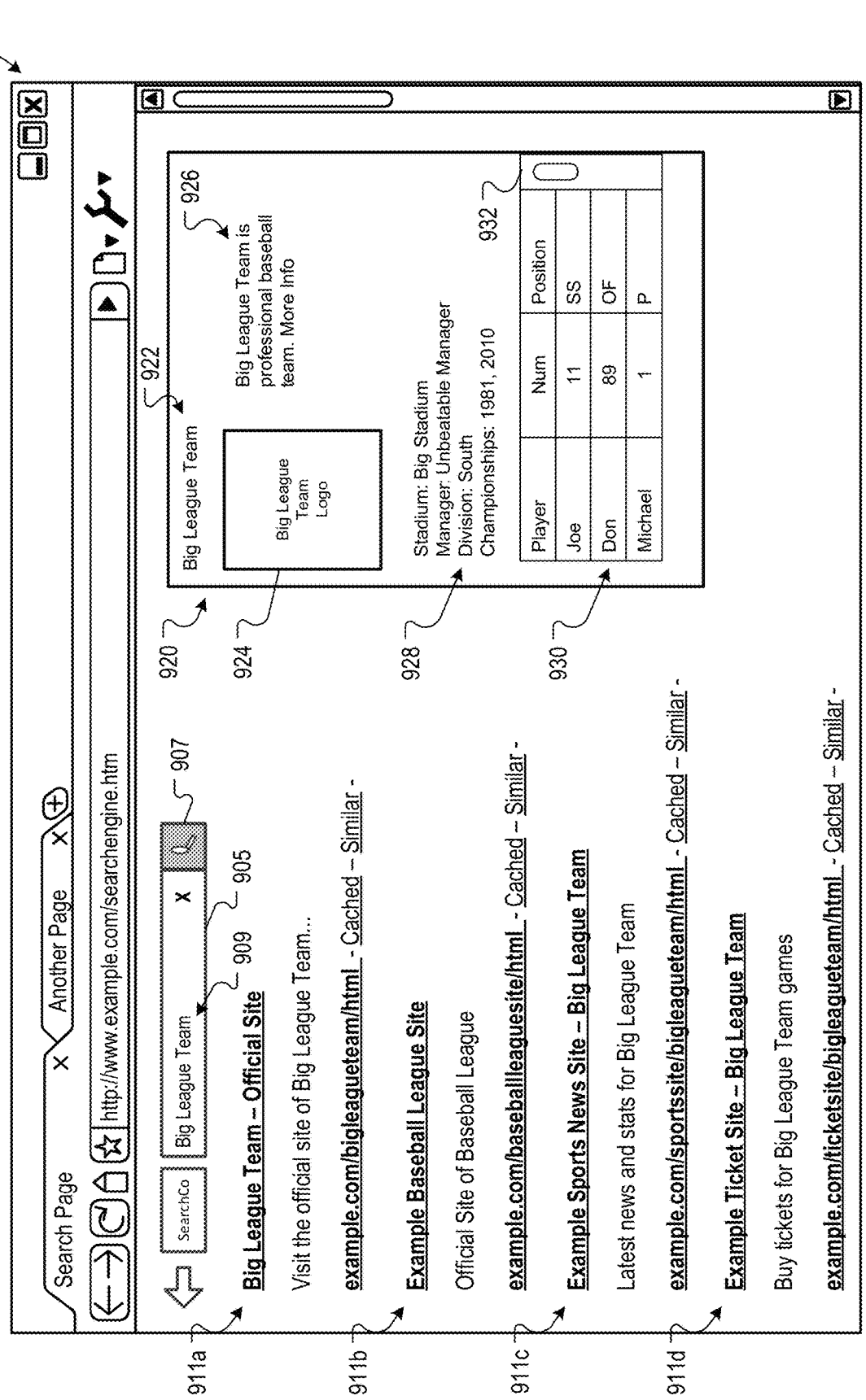
FIG. 9 is a screen shot of another example search interface in which a knowledge panel is presented with search results.

In this example, Famous Actor is credited with movie appearances and music. To present information regarding the movie appearances and the music of Famous Actor, the knowledge panel 520 includes a set of images 530 of movie posters for movies in which Famous Actor appeared and a set of images 532 for albums released by Famous Actor. In some implementations, a table may be used to provide information about movies, albums, or songs related to Famous Actor. An example table is depicted in FIG. 9 and described below.

The knowledge panel 520 also includes a social networking element 534. A social networking element is a user interface element that provides information about a social network page that is related to the entity for which the knowledge panel is being provided. For example, the social networking element 534 depicts a recent post that has been published on a social networking page for Famous Actor. Social networking elements may be included in knowledge panels for people that have a public social networking page and/or for people that have been referenced by public user posts in social networking environments.

Figure 5B:
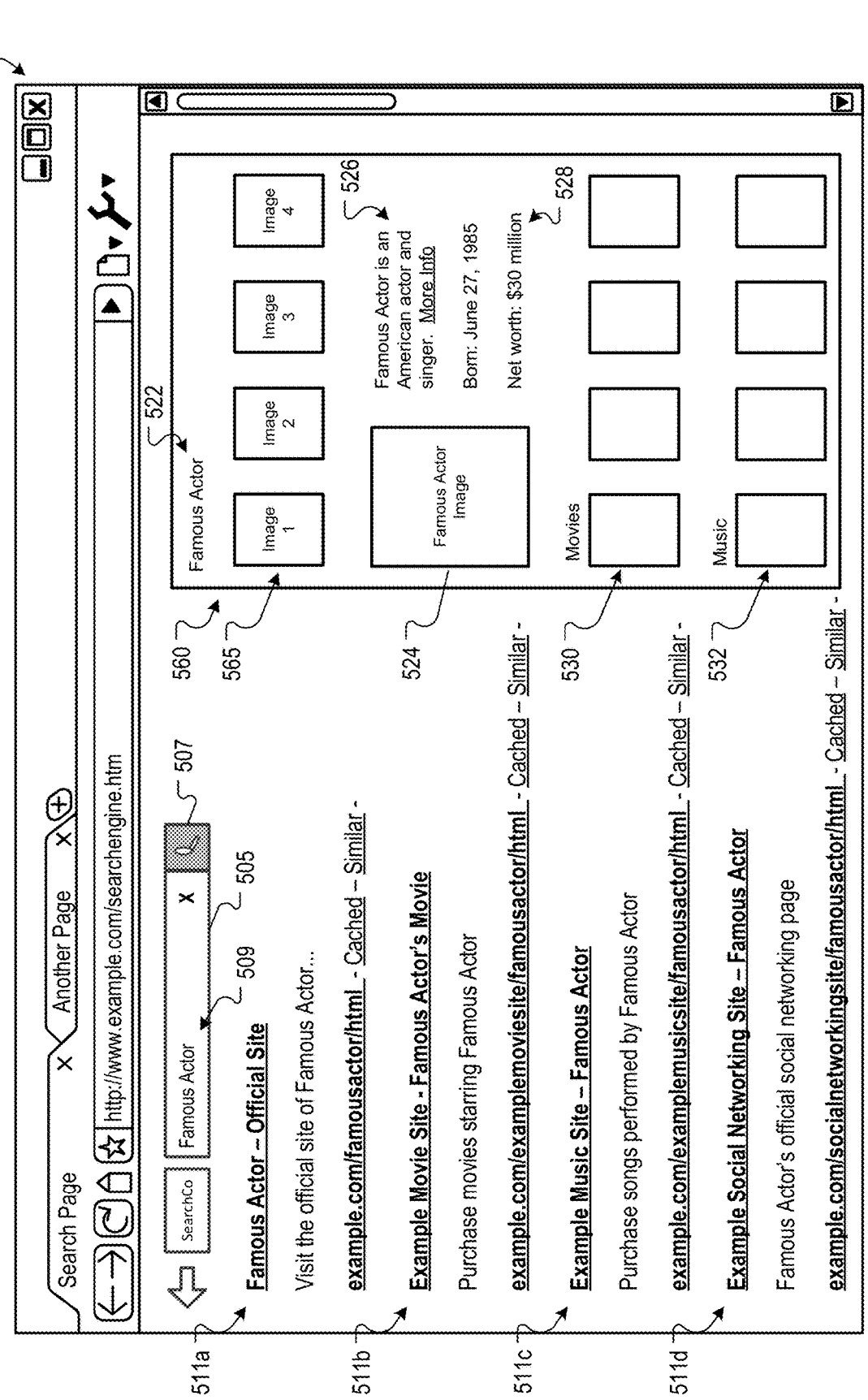
FIG. 5B is a screen shot of another example search interface in which a knowledge panel is presented with search results.

FIG. 5B is a screen shot of another example search interface 550 in which a knowledge panel 560 is presented with search results 511a-511d. The example search interface 550 has content and features similar to those of the search interface 500 of FIG. 5A. However, the knowledge panel 560 of FIG. 5B includes a row of images 565 related to Famous Actor near the top of the knowledge panel 560. In some implementations, the knowledge panel apparatus 130 can perform a web search, for example at query time, to identify content to include in a knowledge panel. This search can be limited to certain types of content, such as for images, video, books, other types of content. In some implementations, the knowledge panel apparatus 130 performs certain types of searches based on the type of entity referenced in the knowledge panel. For example, the knowledge panel apparatus 130 may initiate a search for images or videos to include in a knowledge panel for a famous person. By way of another example, the knowledge panel apparatus 130 may initiate a search for maps or images of landmarks to include in a knowledge panel for a place or a landmark.

In some implementations, the knowledge panel apparatus 130 provides search criteria to the search system 120. For example, to identify the images 565 of Famous Actor included in the knowledge panel 560, the knowledge panel apparatus 130 can provide search criteria that identifies Famous Actor and that also identifies the type of search, i.e., an image search. The search criteria can identify the entity for which the knowledge panel is provided or the search query received from the user device 106. The search system 120 can identify content responsive to the search criteria and provide the content to the knowledge panel apparatus 130. In turn, the knowledge panel apparatus 130 may select at least a portion of the content for the knowledge panel. For example, the search system 120 may have provided many images related to Famous Actor. The knowledge panel apparatus 130 can select a portion of the received images, for example a portion of the higher ranked images, for inclusion in the knowledge panel 560

Figure 6:
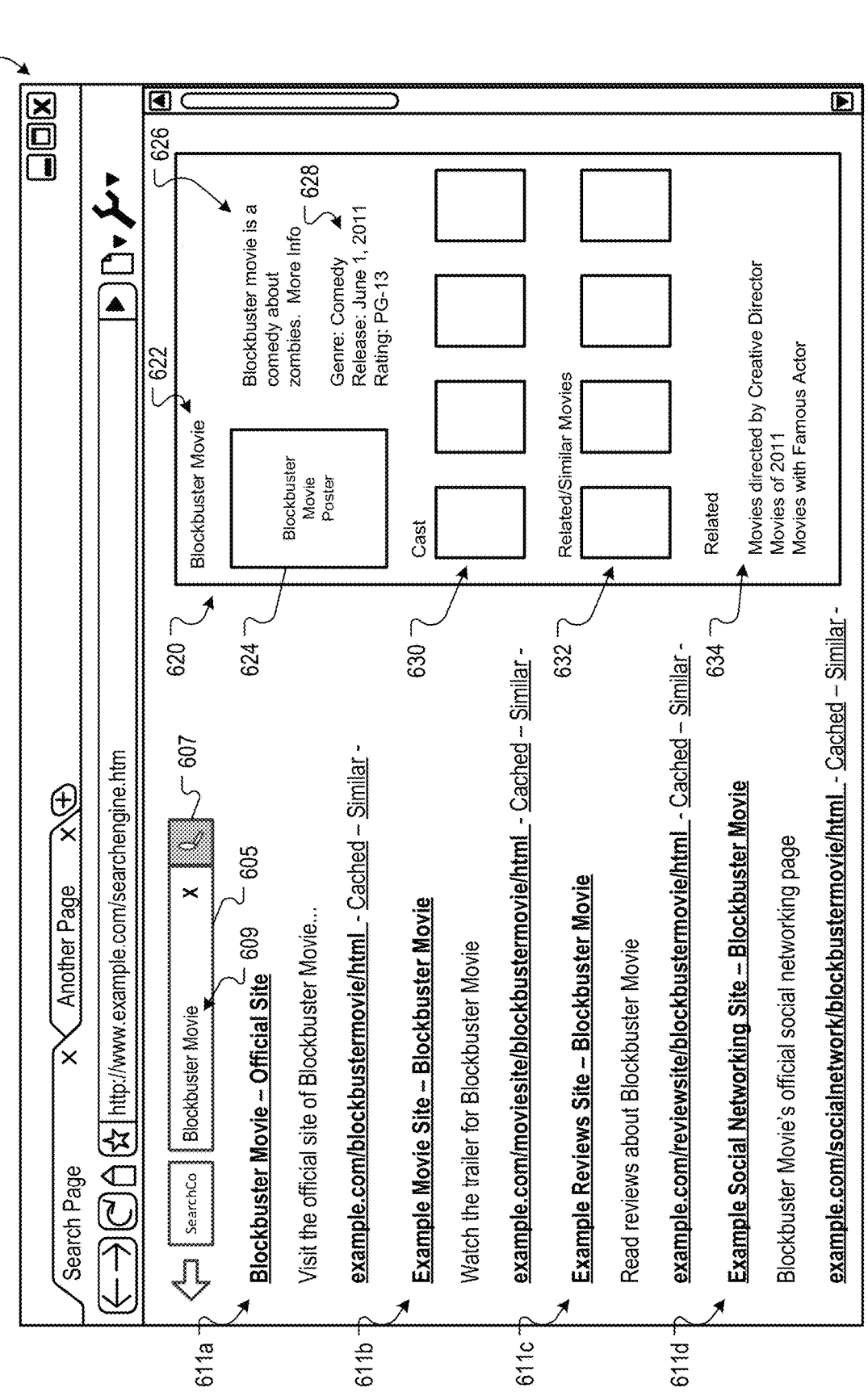
FIG. 6 is a screen shot of another example search interface in which a knowledge panel is presented with search results.

FIG. 6 is a screen shot of another example search interface 600 in which a knowledge panel 620 is presented with search results 611a-611d. Similar to the search interface 300, the search interface 600 includes a query entry field 605 in which a user can enter a search query 609 and a search initiation element 607 with a search query 609 can be submitted to the search system 120. The search interface 600 also includes search results 611a-611d and a knowledge panel 620. In this example search interface 600, the knowledge panel 620 and the search results 611a-611d have been received from the search system 120 and/or the knowledge panel apparatus 130 in response to the submission of the search query "Blockbuster Movie."

The knowledge panel 620 is for a movie ("Blockbuster Movie"), and can be generated using a "movie" template. The "movie" template can include placeholders for types of content related to movies, such as a title, an image for the movie, e.g., image of movie poster for the movie, a description of the movie, a set of facts about the movie, one or more sets of images that have been deemed relevant to the movie, and related search queries for the movie.

The knowledge panel 620 includes a title 622, an image of a movie poster for Blockbuster Movie 624, a description of Blockbuster Movie 626, and a set of facts about Blockbuster Movie 628. This example set of facts includes the genre, release date, and rating of Blockbuster Movie. Other facts regarding a movie that may be presented in a knowledge panel include the cast, director, producer, production companies, revenue generated by the movie, location where the movie was filmed and any other relevant facts.

The knowledge panel 620 also includes a set of images 630 that includes images of the cast for Blockbuster Movie, and a set of images 632 that includes images for related or similar movies. Each of the images 630 and 632 can include a link that, when selected, initiates a search by the search system 120 for information about the subject of the image. The knowledge panel 620 also includes links to related search queries 634.

A similar knowledge panel may be provided for other types of entities such as music, television shows, etc. In some implementations, a knowledge panel for movies or other purchasable items includes a user interface element that enables users to purchase the item.

Figure 7:
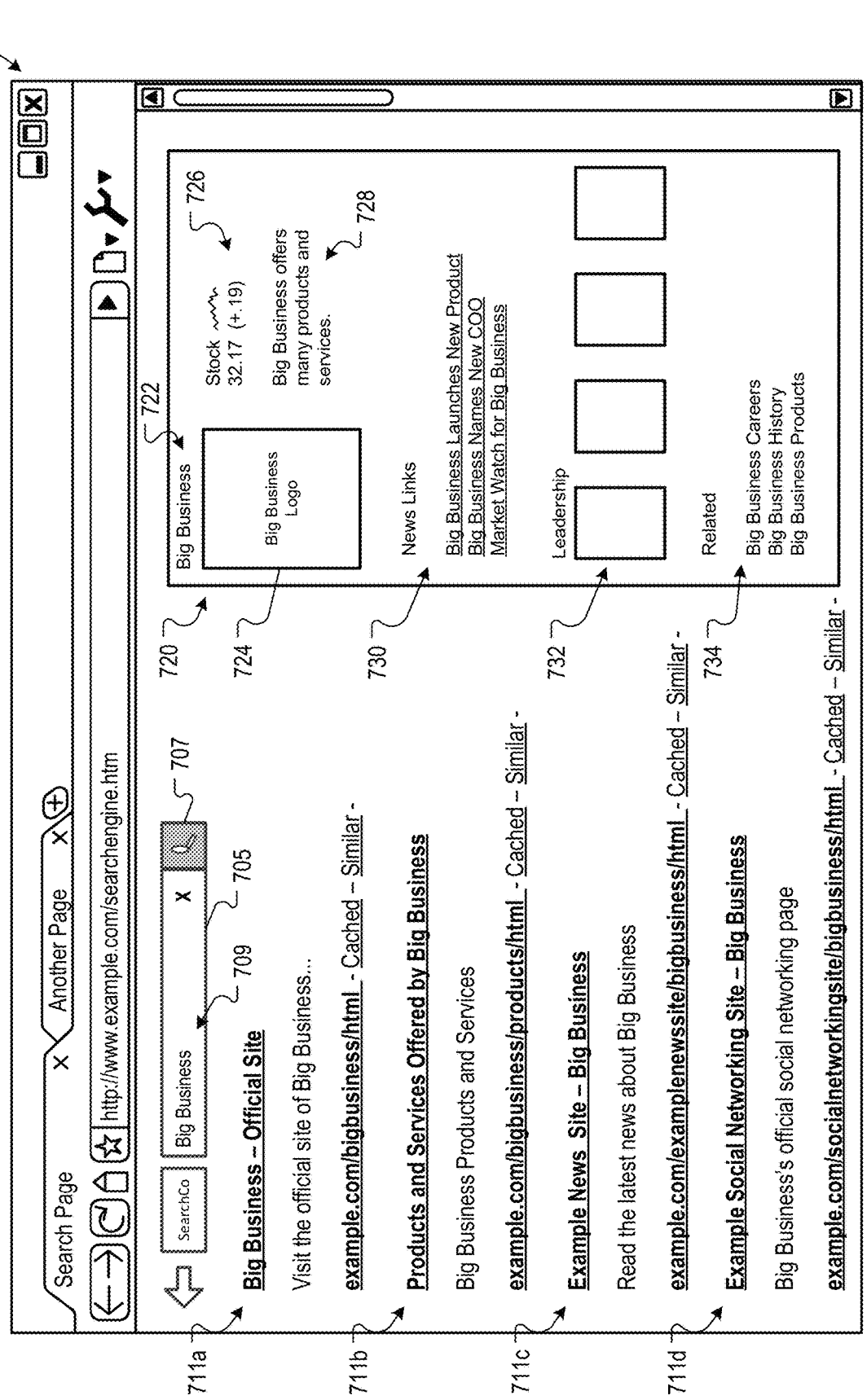
FIG. 7 is a screen shot of another example search interface in which a knowledge panel is presented with search results.

FIG. 7 is a screen shot of another example search interface 700 in which a knowledge panel 720 is presented with search results 711a-711d. Similar to the search interface 300, the search interface 700 includes a query entry field 705 in which a user can enter a search query 709 and a search initiation element 707 with which a search query 709 can be submitted to the search system 120. The search interface 700 also includes search results 711a-711d and a knowledge panel 720. In this example search interface 700, the knowledge panel 720 and the search results 711a-711d have been received from the search system 120 and/or the knowledge panel apparatus 130 in response to the submission of the search query "Big Business."

The knowledge panel 720 is for a business ("Big Business"), and can be generated using a "business" knowledge panel template. The "business" template can include placeholders for content related to businesses, such as a title, an image depicting a logo for the business, a description of the business, a set of facts about the business, a stock quote element having stock information for the business, if appropriate, one or more sets of images that have been deemed relevant to the business, a map to a location of the business, links to additional information about the business, and related search queries related to the business. The "business" template can be used for other organizations as well, such as non-profit organizations, schools, churches, or clubs to name a few.

The knowledge panel 720 includes a title 722, an image depicting a logo for Big Business 724, a stock element 726 that presents stock information for Big Business, and a description of Big Business 728. The knowledge panel 720 also includes a set of links 730 that each link to a resource having additional information about Big Business.

The knowledge panel 720 also includes a set of images 732 that includes images of the leadership of Big Business. For example, the images 732 may include images of the CEO, COO, or other prominent leaders of Big Business. Each of the images 732 can include a link that, when selected, initiates a search for the subject of the image. For example, user interaction with (e.g., a user click of) an image of the CEO of Big Business may cause the name of the CEO to be submitted as a search query to the search system 120. Other sets of images may also be included for businesses, such as images of products offered by the business. The knowledge panel 720 also includes links to related search queries 734.

Figure 8:
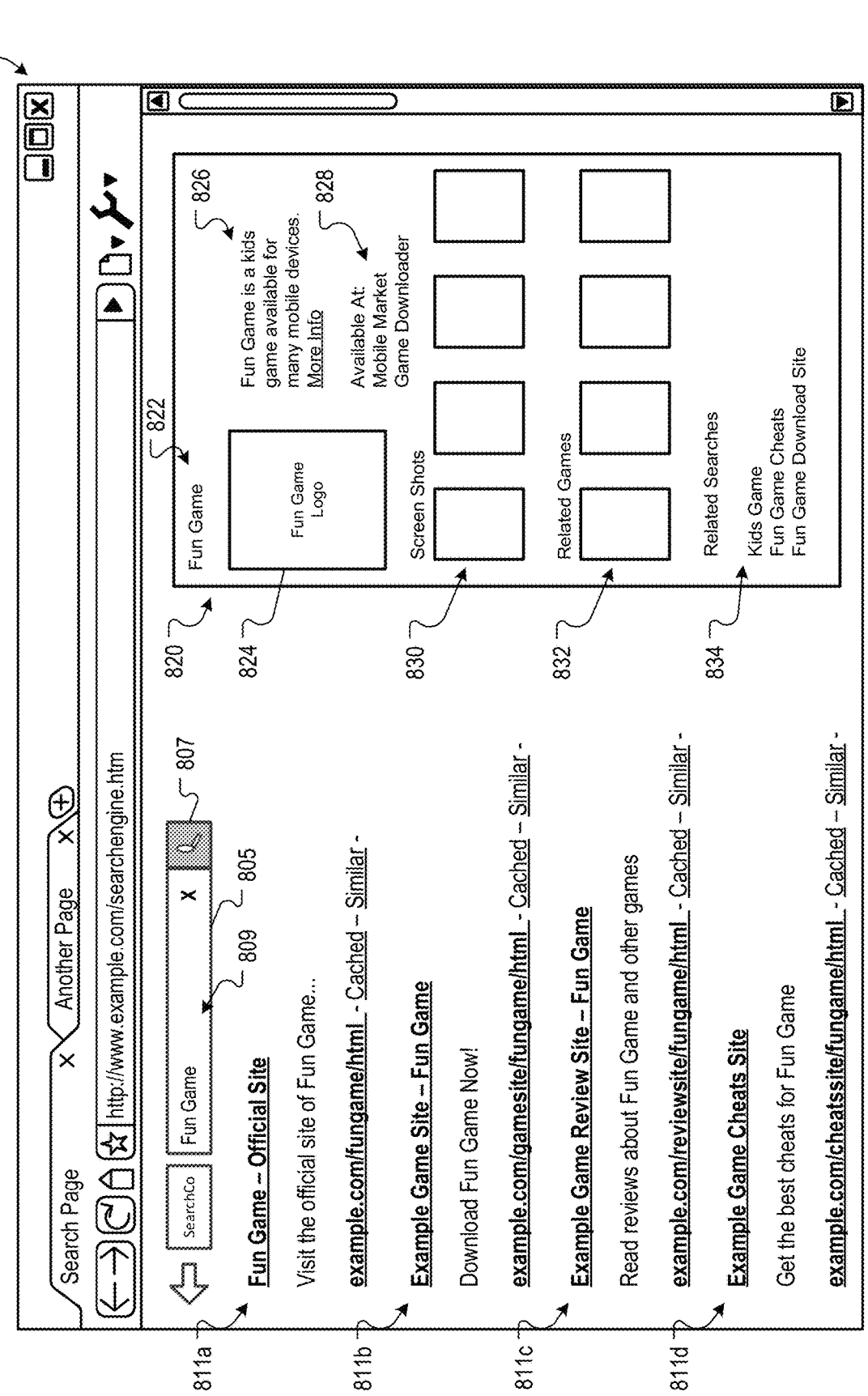
FIG. 8 is a screen shot of another example search interface in which a knowledge panel is presented with search results.

FIG. 8 is a screen shot of another example search interface 800 in which a knowledge panel 820 is presented with search results 811a-811d. Similar to the search interface 300, the search interface 800 includes a query entry field 805 in which a user can enter a search query 809 and a search initiation element 807 with which a search query 809 can be submitted to the search system 120. The search interface 800 also includes search results 811a-811d and a knowledge panel 820. In this example search interface 800, the knowledge panel 820 and the search results 811a-811d have been received from the search system 120 and/or the knowledge panel apparatus 130 in response to the submission of the search query "Fun Game."

The knowledge panel 820 is for a game ("Fun Game"), and can be generated using a "game" template. The "game" template can include placeholders for types of content related to games, such as a title, an image of a logo for the game, a description of the game, a set of facts about the game, one or more sets of images that have been deemed relevant to the game, and related search queries related to the game.

The knowledge panel 820 includes a title 822, an image of a logo for Fun Game 824, a description of Fun Game 826, and a list of vendors at which Fun Game is offered 828. The knowledge panel 820 also includes a set of images 830 that includes images of screen shots from Fun Game, and a set of images 832 that includes images for related or similar games, such as other games that are often purchased by users that purchased Fun Game. Each of the images 830 and 832 can include a link that, when selected, initiates a search for the subject of the image. The knowledge panel 820 also includes links to related search queries 834.

FIG. 9 is a screen shot of another example search interface 900 in which a knowledge panel 920 is presented with search results 911a-911d. Similar to the search interface 300, the search interface 900 includes a query entry field 905 in which a user can enter a search query 909 and a search initiation element 907 with which a search query 909 can be submitted to the search system 120. The search interface 900 also includes search results 911a-911d and a knowledge panel 920. In this example search interface 920, the knowledge panel 920 and the search results 911a-911d have been received from the search system 120 in response to the submission of the search query "Big League Team."

The knowledge panel 920 is for a sports team ("Big League Team"), and can be generated using a "sports team" knowledge panel template. The "sports team" template can include placeholders for content related to sports teams, such as a title, an image of a logo for the team, a description of the team, a set of facts about the team, one or more sets of images that have been deemed relevant to the sports team, information regarding members of the team, a schedule for the team, and related search queries.

The knowledge panel 920 includes a title 922, an image of a logo for Big League Team 924, a description of Big League Team 926, and a set of facts about Big League Team 928. The set of facts include the stadium, manager, division, and years in which Big League Team won championships.

The knowledge panel 920 also includes a table element 930 that includes information regarding players of Big League Team. In particular, the table element 930 includes the names of the players, the jersey numbers of the players, and the position for the players. The example table element 930 includes a scroll bar 932. The scroll bar 932 enables a user to view additional information in the table element 930. For example, if the user scrolls the scroll bar 932 down, the user device 106 presenting the search interface 900 will display lower rows of the table element 930 that are not currently in view.

Some queries may be related to multiple entities, such that identifying the entity for which the query is directed may be difficult. For example, a search query of "phoenix" may be directed to the city in Arizona or the mythical bird. For such queries, the knowledge panel apparatus 130 may provide a disambiguation knowledge panel having information about multiple entities. For example, the knowledge panel apparatus 130 may generate a disambiguation knowledge panel for the search query "phoenix" that includes disambiguation information about the city in Arizona and information about the mythical bird. Disambiguation information can be considered content that distinguishes between different meanings associated with an ambiguous term. Accordingly, disambiguation information can include content characterizing at least one distinct meaning for a term that has multiple meanings.

Figure 10:
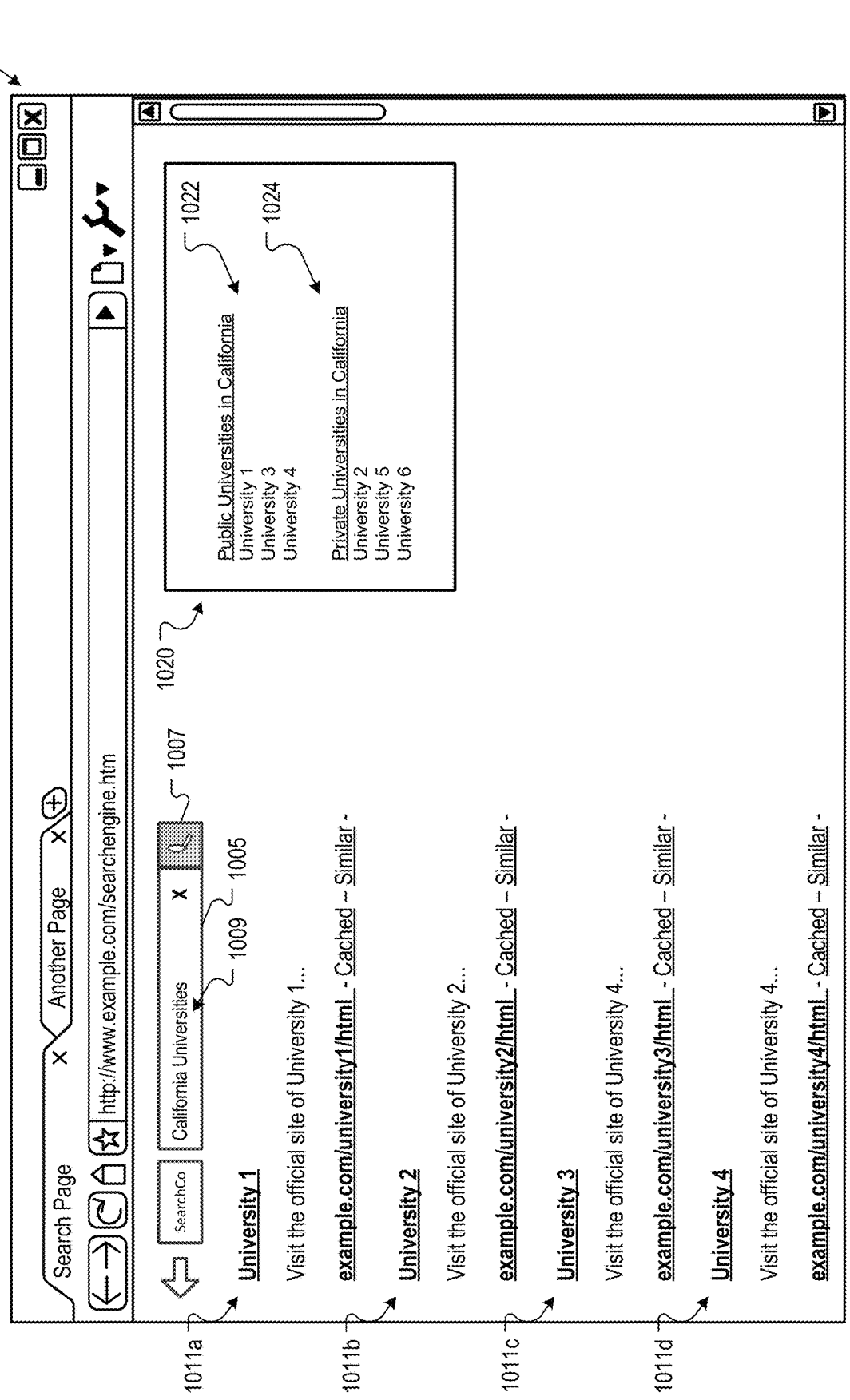
FIG. 10 is a screen shot of another example search interface in which a knowledge panel is presented with search results.

FIG. 10 is a screen shot of another example search interface 1000 in which a knowledge panel 1020 is presented with search results 1011a-1011d. Similar to the search interface 300, the search interface 1000 includes a query entry field 1005 in which a user can enter a search query 1009 and a search initiation element 1007 with which a search query 1009 can be submitted to the search system 120. The search interface 1000 also includes search results 1011a-1011d and an example disambiguation knowledge panel 1120. In this example search interface 1000, the knowledge panel 1020 and the search results 1011a-1011d have been received from the search system 120 in response to the submission of the search query "California Universities."

As there are many universities in California, it may difficult to determine an appropriate university for which to provide a knowledge panel. Thus, the knowledge panel apparatus 130 may provide the disambiguation knowledge panel 1020, which includes content about multiple universities in California. In particular, the knowledge panel 1020 includes content for several public universities located in California 1022 and content for several private universities located in California 1024. The content for each university can include a link that, when selected, initiates a search for that university, or that links to the official web page for the university.

Figure 11:
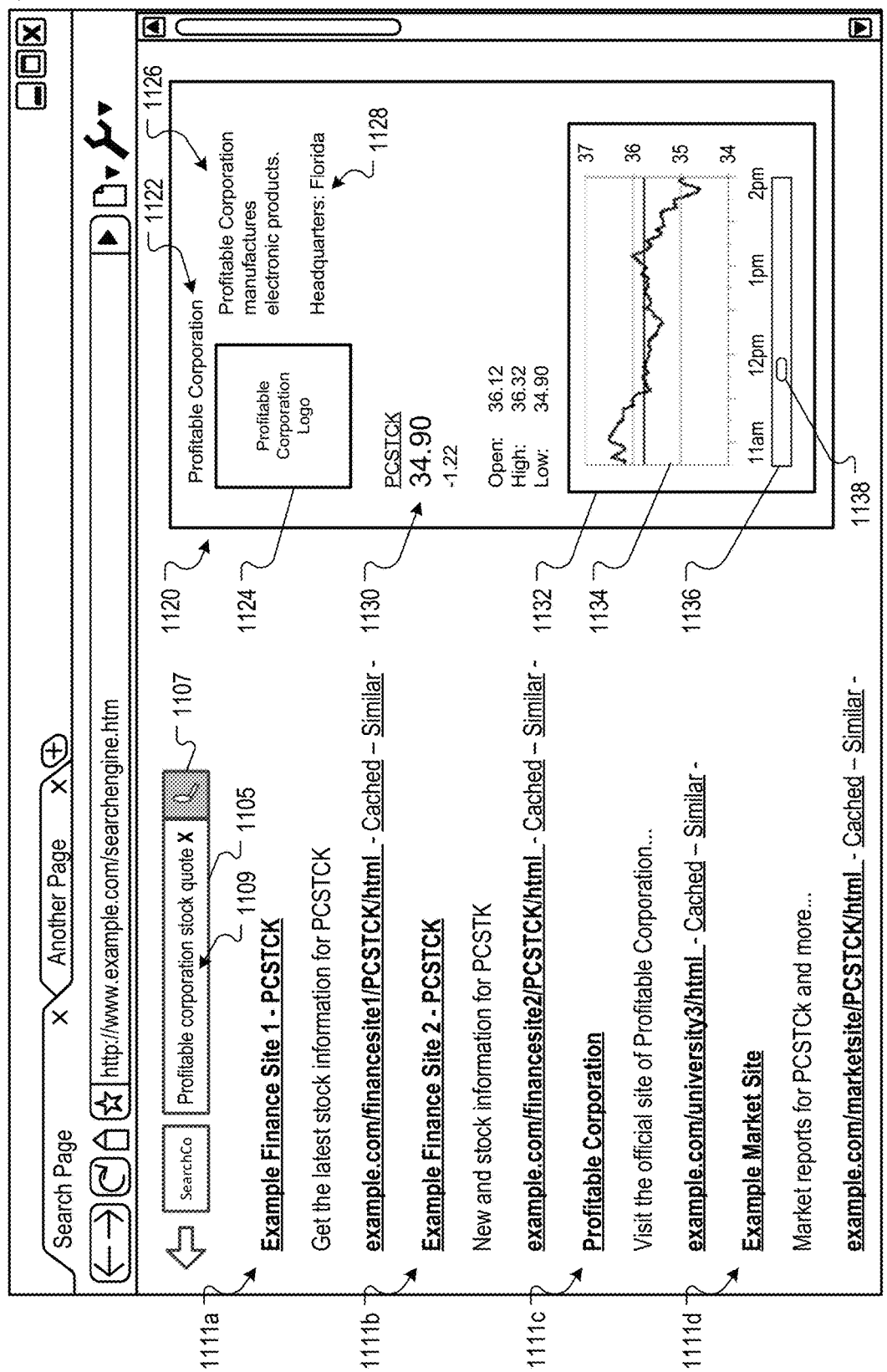
FIG. 11 is a screen shot of another example search interface in which a knowledge panel is presented with search results.

FIG. 11 is a screen shot of another example search interface 1100 in which a knowledge panel 120 is presented with search results 1111a-1111d. Similar to the search interface 300, the search interface 1100 includes a query entry field 1105 in which a user can enter a search query 1109 and a search initiation element 1107 with which a search query 1109 can be submitted to the search system 120. The search interface 1100 also includes search results 1111a-1111d and a knowledge panel 1120. In this example search interface 1120, the knowledge panel 1120 and the search results 1111a-1111d have been received from the search system 120 and/or the knowledge panel apparatus 130 in response to the submission of the search query "profitable corporation stock quote."

The example knowledge panel 1120 depicts a financial stock report for a corporation ("Profitable Corporation"). The knowledge panel 1120 includes a title 1122, an image depicting a logo for Profitable Corporation 1124, a description of Profitable Corporation 1126, and a fact about Profitable Corporation 1128. The knowledge panel 1120 also includes stock pricing information 1130 for Profitable Corporation and an interactive chart user interface element 1132.

The interactive chart user interface element 1132 enables users to select a time period for which to view stock prices in chart form and includes a chart 1134, a scroll bar 1136, and scroll bar element 1138. To move about the chart 1132 and to view stock pricing for a time period that is not currently in view, a user can move the scroll bar element 1138 left and right along the scroll bar 1136. In response, the user device 1106 on which the search interface 1100 is displayed can update the chart 1132 to present the appropriate stock pricing information.

In some implementations, stock pricing information that can be presented in the interactive chart user interface element 1132 is provided to the user device 106 in advance of user interaction with the interactive chart user interface element 1132. In this way, the user device 106 can update the chart 134 in response to user interaction with the scroll bar 1136 without initiating additional content requests to the search system 120 or to another resource. In some implementations, the interactive chart user interface element 1132 causes the user device 106 to request additional stock pricing information in response to user interaction with the scroll bar 1136. Either way, the chart can be updated within the knowledge panel 1120 without navigating away from the page depicting the search results 1111a-1111d and the knowledge panel 1120.

Other types of knowledge panels can also incorporate similar interactive user interface elements. For example, a knowledge panel having weather related content for a particular location may include an interactive user interface element that enables the user to select a time period for weather information or a location for which weather information is desired.

Figure 12:
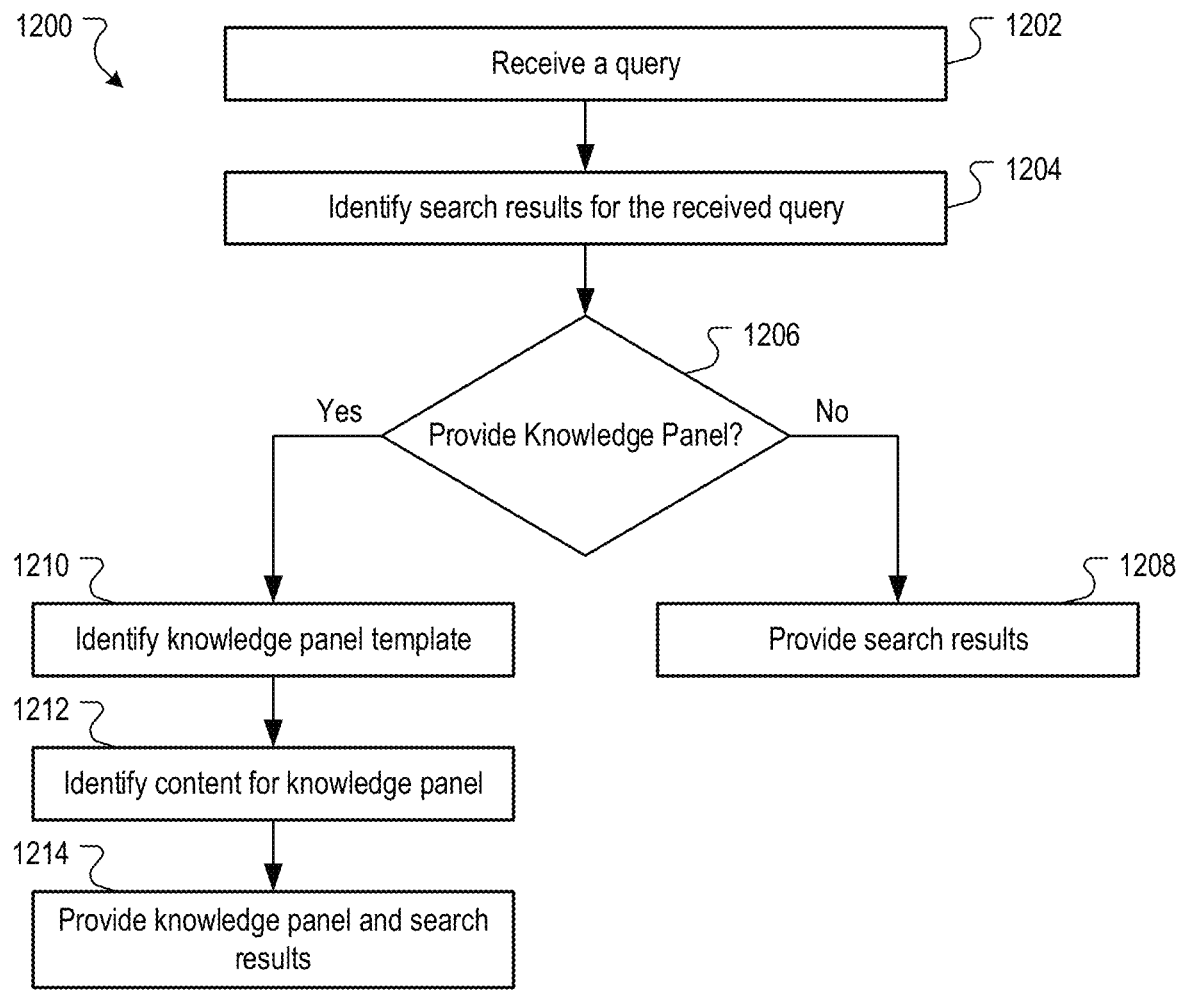
FIG. 12 is a flow chart of an example process for providing a knowledge panel with search results for a search query.

FIG. 12 is a flow chart of an example process 1200 for providing a knowledge panel with search results for a search query. The process 1200 can be implemented, for example, by the search system 120 in conjunction with the knowledge panel apparatus 130.

Query data specifying a search query 109 is received (1202). For example, the search system 120 may receive query data specifying a user query from a user device 106. In response to receiving the query data, the search system 120 may identify search results 111 responsive to the search query 109 specified by the query data (1204).

A determination is made whether to provide a knowledge panel 113 with the search results (1206). In some implementations, the knowledge panel apparatus 130 determines whether to provide a knowledge panel 113 based on the received search query 109. For example, the search system 120 may provide the search query 109 to the knowledge panel apparatus 130 with a request to provide a knowledge panel 113.

In some implementations, the knowledge panel apparatus 130 determines whether to provide a knowledge panel 113 for the search query based on whether the received search query 109 includes or references a factual entity. The knowledge panel apparatus 130 can determine whether the search query 109 references a known factual entity and, if so, determine to provide a knowledge panel 113 for the factual entity. In some implementations, a factual entity is a single conceptual entity, such as a person, place, country, landmark, animal, historical event, organization, business, sports team, sporting event, movie, song, album, game, work of art, or any other entity. In some implementations, a factual entity is a concept, subject, or topic.

In some implementations, the knowledge panel apparatus 130 determines whether a search query references a factual entity by comparing one or more terms of the search query to a list of known factual entities. For example, if the search query is "songs by Ima Singer," the knowledge panel apparatus 130 may determine whether "Ima Singer" is a factual entity by comparing "Ima" and/or "Singer" to a list of known factual entities that are stored in a database. If there is a match to a factual entity of "Ima Singer" or an alias of "Ima Singer," the knowledge panel apparatus 130 may determine to provide a knowledge panel 113 for "Ima Singer" with search results 111 for the search query "songs by Ima Singer."

In some implementations, the knowledge panel apparatus 130 determines whether to provide a knowledge panel 113 based on whether there are multiple distinct meanings associated with the received search query 109. For example, the knowledge panel apparatus 130 may determine whether the received search query 109 is associated with multiple distinct meanings by comparing each term of the received search query 109 to a list of terms that have multiple distinct meanings. For example, if the received search query 109 includes the term "phoenix," the knowledge panel apparatus 130 may determine that the received search query 109 has multiple distinct meanings as the term "phoenix" can correspond to the city in Arizona (one distinct meaning) or the mythical bird (another distinct meaning).

In some implementations, the knowledge panel apparatus 130 considers other terms in the received search query 109 when determining whether the search query 109 includes multiple distinct meanings. For example, if the received search query 109 includes "phoenix" and "Arizona," the knowledge panel apparatus 130 may determine that the search query 109 is directed to the city in Arizona rather than the mythical bird.

If the knowledge panel apparatus 130 determines that the received search query 109 is associated with multiple distinct meanings, the knowledge panel apparatus 130 may determine to provide a disambiguation knowledge panel with content directed to two or more of the distinct meanings.

If a determination is made to not provide a knowledge panel 113, the search system 1100 provides the identified search results for the received search query (1208). For example, the knowledge panel apparatus 130 may provide data to the search system 120 that specifies that a knowledge panel 113 will not be provided for the received search query 109. In turn, the search system 120 can provide the identified search results 111 to the user device 106 from which the search query 109 was received without providing a knowledge panel (or content items for populating a knowledge panel) for presentation on the user device 106.

If a determination is made to provide a knowledge panel 113, the knowledge panel apparatus 130 identifies a knowledge panel template for the entity referenced by the received search query (1210). As described above, the knowledge panel templates store 134 can include one or more templates for each of a set of entity types. For example, the knowledge panel templates store 134 may include a "person" template and/or a "place" template.

The knowledge panel apparatus 130 can determine the type of entity referenced by the received search query 109 and access the knowledge panel templates store 134 to retrieve the appropriate knowledge panel template for the entity. For example, the index of the content items store 132 may include data identifying the type of entity for each entity indexed therein. In another example, the index of the content items store 132 may include data identifying the appropriate knowledge panel template for each entity. The knowledge panel apparatus 130 can access the index to identify the appropriate template for the entity referenced by the received search query.

Content items are identified for the knowledge panel (1212). In some implementations, the knowledge panel apparatus 130 identifies content items for the entity referenced by the search query based on the identified knowledge panel template. For example, the knowledge panel template may specify types of content items for the template and include placeholders for the specified types of content items. For example, a knowledge panel template for a person may include placeholders for a title, e.g., name of the person, an image of the person, a description of the person, a set of facts about the person, an additional content for the person.

In some implementations, the knowledge panel apparatus 130 accesses the content items store 132 to identify the appropriate content for the knowledge panel based on the content specified by the identified knowledge panel template. For example, the content items store 132 can include an index of content items for each of a set of entities. The index may include data identifying a title for the entity, an image for the entity, and each other type of content for use in a knowledge panel. As described above, the content items for a particular entity may be obtained from multiple disparate content sources.

In some implementations, the knowledge panel apparatus 130 accesses several databases dynamically to identify content items for the knowledge panel. For example, if one of the specified content items is a birth date for an actor or singer, the knowledge panel apparatus 130 may access a database of celebrity birthdates to obtain the birth date of the actor or singer. This operation may be performed before or after receipt of the search query 109.

The knowledge panel and search results are provided (1214). In some implementations, the knowledge panel apparatus 130 generates the knowledge panel 113 and provides the knowledge panel 113 to the search system 120. For example, the knowledge panel apparatus 130 may generate the knowledge panel 113 by populating the identified knowledge panel template with the identified content items and provide the generated knowledge panel 113 to the search system 120. In turn, the search system 120 can provide the identified search results and the knowledge panel 113 to the user device 106 for presentation.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus of a client device, the method comprising:
   providing, to a search engine, a query that references a given entity;
   receiving, from the search engine, (i) a set of search results that each reference a respective electronic resource that is related to the query and (ii) a knowledge panel that includes content that provides an information summary for the given entity, the knowledge panel including an interactive user interface element that presents content related to the given entity and enables a user of the client device to request additional content for presentation in the interactive user interface element;
   presenting, on a search results page, the search results and the knowledge panel;
   detecting a user interaction with the interactive user interface element; and
   presenting, in the interactive user interface element, additional content that is related to the given entity without navigating away from the search results page and while maintaining presentation of at least a portion of the content that provides the information summary for the given entity in the knowledge panel, wherein the additional content is not presented in the knowledge panel prior to the user interaction.

2. The method of claim 1, wherein presenting, in the interactive user interface element, the additional content comprises receiving the additional content at the client device prior to the user interaction and presenting the additional content without transmitting a request for the additional content over a network.

3. The method of claim 1, wherein:
   the interactive user interface element comprises an interactive chart;
   the user interaction comprises interaction with a control for requesting a view of different data in the interactive chart; and
   presenting, in the interactive user interface element, the additional content comprises updating the interactive chart to present the different data based on the interaction with the control.

4. The method of claim 1, wherein:
   the interactive user interface element comprises an interactive map that includes a geographic location of the given entity;
   the user interaction comprises a request for directions to the geographic location of the given entity; and
   presenting, in the interactive user interface element, the additional content comprises presenting directions from a location of the client device to the geographic location of the given entity.

5. The method of claim 1, wherein:
   the given entity is a given geographic location;
   the interactive user interface element comprises an interactive weather information element that presents weather information for the given geographic location;
   the user interaction comprises interaction with a control for requesting a view of different weather information in the interactive weather information element; and
   presenting, in the interactive user interface element, the additional content comprises updating the interactive weather information element to present the different weather information based on the interaction with the control.

6. The method of claim 1, wherein:
   the interactive user interface element comprises an interactive scroll bar;
   detecting the user interaction with the interactive user interface element comprises detecting movement of the interactive scroll bar in a particular direction; and
   presenting, in the interactive user interface element, the additional content comprises updating the interactive user interface element with the additional content based on the particular direction.

7. The method of claim 6, wherein the interactive user interface element comprises a table of information for the given entity and presenting the additional content comprises presenting one or more additional rows or one or more additional columns of the table of information based on the particular direction.

8. A method performed by data processing apparatus, the method comprising:
   receiving, from a client device, a query that references a given entity;
   providing, for presentation by the client device, a search results page comprising (i) a set of search results that each reference a respective electronic resource that is related to the received query and (ii) a knowledge panel that includes content that provides an information summary for the given entity, the knowledge panel including an interactive user interface element that presents content related to the given entity and enables a user of the client device to request additional content for presentation in the interactive user interface element;
   detecting, based on data received from the client device, a user interaction with the interactive user interface element; and
   providing, to the client device and for presentation in the interactive user interface element, additional content that is related to the given entity, wherein the client device presents the additional content without navigating away from the search results page and while maintaining presentation of at least a portion of the content that provides the information summary for the given entity in the knowledge panel, and wherein the additional content is not presented in the knowledge panel prior to the user interaction.

9. The method of claim 8, wherein presenting, in the interactive user interface element, the additional content comprises receiving the additional content at the client device prior to the user interaction and presenting the additional content without transmitting a request for the additional content over a network.

10. The method of claim 8, wherein:
    the interactive user interface element comprises an interactive chart;
    the user interaction comprises interaction with a control for requesting a view of different data in the interactive chart; and
    providing, to the client device and for presentation in the interactive user interface element, the additional content comprises updating the interactive chart to present the different data based on the interaction with the control.

11. The method of claim 8, wherein:
    the interactive user interface element comprises an interactive map that includes a geographic location of the given entity;

the user interaction comprises a request for directions to the geographic location of the given entity; and providing, to the client device and for presentation in the interactive user interface element, the additional content comprises providing, for presentation in the interactive map, directions from a location of the client device to the geographic location of the given entity.

12. The method of claim 8, wherein:

the given entity is a given geographic location;

the interactive user interface element comprises an interactive weather information element that presents weather information for the given geographic location;

the user interaction comprises interaction with a control for requesting a view of different weather information in the interactive weather information element; and providing, to the client device and for presentation in the interactive user interface element, the additional content comprises updating the interactive weather information element to present the different weather information based on the interaction with the control.

13. The method of claim 8, wherein:

the interactive user interface element comprises an interactive scroll bar;

detecting the user interaction with the interactive user interface element comprises detecting movement of the interactive scroll bar in a particular direction; and providing, to the client device and for presentation in the interactive user interface element, the additional content comprises updating the interactive user interface element with the additional content based on the particular direction.

14. The method of claim 13, wherein the interactive user interface element comprises a table of information for the given entity and presenting the additional content comprises presenting one or more additional rows or one or more additional columns of the table of information based on the particular direction.

15. A system comprising:

a data processing apparatus; and a computer storage medium encoded with a computer program, the computer program comprising data processing apparatus instructions that when executed by the data processing apparatus cause the data processing apparatus to perform operations comprising:

receiving, from a client device, a query that references a given entity;

providing, for presentation by the client device, a search results page comprising (i) a set of search results that each reference a respective electronic resource that is related to the received query and (ii) a knowledge panel that includes content that provides an information summary for the given entity, the knowledge panel including an interactive user interface element that presents content related to the given entity and enables a user of the client device to request additional content for presentation in the interactive user interface element;

detecting, based on data received from the client device, a user interaction with the interactive user interface element; and providing, to the client device and for presentation in the interactive user interface element, additional content that is related to the given entity, wherein the client device presents the additional content without navigating away from the search results page and while maintaining presentation of at least a portion of the content that provides the information summary for the given entity in the knowledge panel, and wherein the additional content is not presented in the knowledge panel prior to the user interaction.

16. The system of claim 15, wherein presenting, in the interactive user interface element, the additional content comprises receiving the additional content at the client device prior to the user interaction and presenting the additional content without transmitting a request for the additional content over a network.

17. The system of claim 15, wherein:

the interactive user interface element comprises an interactive chart;

the user interaction comprises interaction with a control for requesting a view of different data in the interactive chart; and providing, to the client device and for presentation in the interactive user interface element, the additional content comprises updating the interactive chart to present the different data based on the interaction with the control.

18. The system of claim 15, wherein:

the interactive user interface element comprises an interactive map that includes a geographic location of the given entity;

the user interaction comprises a request for directions to the geographic location of the given entity; and providing, to the client device and for presentation in the interactive user interface element, the additional content comprises providing, for presentation in the interactive map, directions from a location of the client device to the geographic location of the given entity.

19. The system of claim 15, wherein:

the given entity is a given geographic location;

the interactive user interface element comprises an interactive weather information element that presents weather information for the given geographic location;

the user interaction comprises interaction with a control for requesting a view of different weather information in the interactive weather information element; and providing, to the client device and for presentation in the interactive user interface element, the additional content comprises updating the interactive weather information element to present the different weather information based on the interaction with the control.

20. The system of claim 15, wherein:

the interactive user interface element comprises an interactive scroll bar;

detecting the user interaction with the interactive user interface element comprises detecting movement of the interactive scroll bar in a particular direction; and providing, to the client device and for presentation in the interactive user interface element, the additional content comprises updating the interactive user interface element with the additional content based on the particular direction.

* * * * *